(12) United States Patent
Yamaguchi

(10) Patent No.: US 7,932,927 B2
(45) Date of Patent: Apr. 26, 2011

(54) APPARATUS AND ASSOCIATED METHODOLOGY OF WIDENING DYNAMIC RANGE IN IMAGE PROCESSING

(75) Inventor: Takuya Yamaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 515 days.

(21) Appl. No.: 11/768,414

(22) Filed: Jun. 26, 2007

(65) Prior Publication Data
US 2008/0007642 A1 Jan. 10, 2008

(30) Foreign Application Priority Data
Jul. 6, 2006 (JP) ................. 2006-186539

(51) Int. Cl.
*H04N 5/228* (2006.01)
(52) U.S. Cl. .................................. 348/222.1
(58) Field of Classification Search .............. None
See application file for complete search history.

(56) References Cited

U.S. PATENT DOCUMENTS

| 5,872,596 | A * | 2/1999 | Yanai et al. ............ 348/297 |
| 6,977,685 | B1 * | 12/2005 | Acosta-Serafini et al. ... 348/308 |
| 2005/0030393 | A1 * | 2/2005 | Tull .............. 348/241 |
| 2006/0132619 | A1 * | 6/2006 | Choi et al. .......... 348/224.1 |

FOREIGN PATENT DOCUMENTS

| JP | 03-020707 | 1/1991 |
| JP | 6-141229 | 5/1994 |
| JP | 2001-054022 | 2/2001 |
| JP | 2001-141562 | 5/2001 |
| JP | 2002-158928 | 5/2002 |
| JP | 2002-325202 | 11/2002 |

* cited by examiner

*Primary Examiner* — Justin P Misleh
(74) *Attorney, Agent, or Firm* — Oblon, Spivak, McClelland, Maier & Neustadt, L.L.P.

(57) ABSTRACT

An image processing apparatus includes an imaging device converting light incident thereon into charge, a determining unit determining for each pixel of the device whether an accumulated charge of the pixel reaches a threshold charge within a shutter period, a measuring unit measuring a threshold arrival period elapsed until the charge reaches the threshold charge, a memory unit storing at least the threshold arrival period of a pixel for which the determining unit determines that a charge of the pixel reaches the threshold charge, an arithmetic unit calculating a charge to be accumulated by incident light in the shutter period on the basis of the stored threshold arrival period and the threshold charge, and a generating unit generating an imaging signal using a pixel value corresponding to the calculated charge as a pixel value of the pixel for which the determining unit determines that the charge reaches the threshold charge.

11 Claims, 15 Drawing Sheets

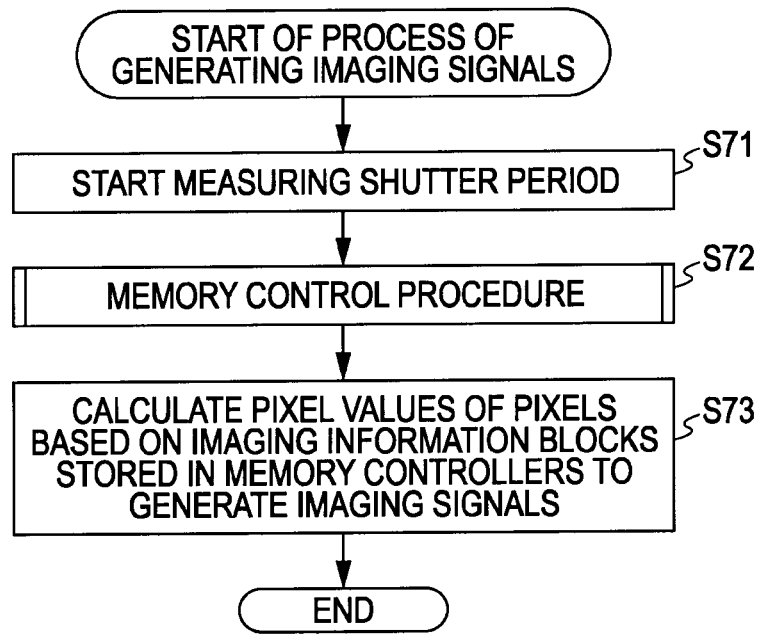
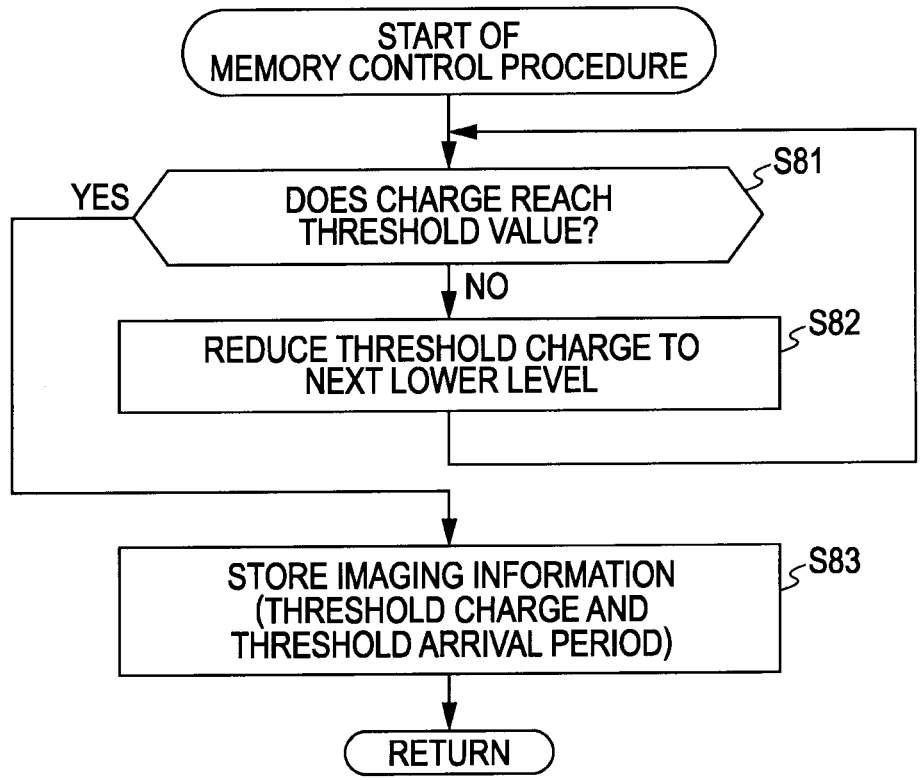

APPARATUS AND ASSOCIATED METHODOLOGY OF WIDENING DYNAMIC RANGE IN IMAGE PROCESSING

CROSS REFERENCES TO RELATED APPLICATIONS

The present invention contains subject matter related to Japanese Patent Application JP 2006-186539 filed in the Japanese Patent Office on Jul. 6, 2006, the entire contents of which are incorporated herein by reference.

BACKGROUND OF THE INVENTION

1. Field of the Invention

The present invention relates to apparatuses and methods of image processing and programs therefor and, more particularly, to an image processing apparatus and method capable of appropriately imaging a subject with a high-brightness portion and a low-brightness portion, and a program therefor.

2. Description of the Related Art

In each of video cameras and digital cameras, the more the amount of light incident on an imaging device, the more the amount of charge (hereinafter, a charge) accumulated in each pixel of the imaging device, resulting in an increase in the amount of information obtained. If a subject has a high-brightness portion, charge accumulated in respective pixels corresponding to the high-brightness portion becomes saturated.

Generally, therefore, a small aperture is selected or shutter speed is increased to determine exposure so that charge accumulated in each pixel is not saturated.

Providing that the amount of incident light is limited, however, when a subject has a low-brightness portion, exposure for pixels corresponding to the low-brightness portion is relatively reduced. Although information related to the high-brightness portion of a subject image is not lost, the amount of information related to the low-brightness portion is lowered.

In image processing after photoelectric conversion, gain-up processing can be performed to make up for the lowered amount of information concerning the low-brightness portion. However, when the amount of original information is low, the gain-up processing is performed not only on a signal component but also on a noise component, thus deteriorating the S/N ratio. When the amount of gain-up is set to a low level to maintain the S/N ratio, an obtained image segment corresponding to the low-brightness portion has no gradations, poor information, black defects, and a narrow dynamic range.

When a large aperture is set or shutter speed is reduced to ensure exposure in order to maintain gradations in a low-brightness portion of a subject, the amount of information related to the low-brightness portion can be ensured in an image. Although exposure for a high-brightness portion in the image is relatively increased, charge accumulated in respective pixels corresponding to the high-brightness portion becomes saturated.

If the charge becomes saturated, an image segment corresponding to the high-brightness portion has no gradations, poor information, white defects, and a narrow dynamic range.

Various methods for ensuring a wide dynamic range are proposed.

Japanese Unexamined Patent Application Publication No. 6-141229 discloses a method (hereinafter, a first method) of combining an image signal of a high-brightness portion of a subject obtained by short-term exposure with an image signal of a low-brightness portion of the subject obtained by long-term exposure to reduce white defects in an image segment corresponding to the high-brightness portion and black defects in an image segment corresponding to the low-brightness portion.

Another method (hereinafter, a second method) is disclosed in "Fundamental Study of Wide Dynamic Range Imaging by Using Selectable-Capacitance Variable-Sensitivity Image Sensor", Journal of the Institute of Image Information and Television Engineers, Vol. 59, No. 1, 2005. According to the second method, a variable-sensitivity image sensor has a variable-sensitivity pixel structure including two kinds of capacitances, i.e., a parasitic capacitance and an additional capacitance. When a subject has low brightness, one capacitance is used. When a subject has high brightness, two capacitances are used. Thus, charge saturation during high sensitive imaging is prevented. In this method, the sensitivity can be selected for each pixel.

SUMMARY OF THE INVENTION

According to the first method, however, shutter periods are provided in a plurality of time sequences to perform short-term exposure and long-term exposure. Disadvantageously, a low-brightness portion and a high-brightness portion in an image may have significant time lag therebetween. Further, since short-term exposure or long-term exposure is exclusively performed, long-term exposure is not used while short-term exposure is performed. Unfortunately, the amount of information related to the low-brightness portion may be insufficient. In addition, if the amount of charge accumulated in a pixel during long-term exposure is not used as much as the charge capacitance of the pixel, the amount of information related to the high-brightness portion may be insufficient.

According to the second method, if accumulated charge exceeds a capacitance obtained by adding the two kinds of capacitances, the charge becomes saturated. Even when the amount of incident light is controlled at an optical system arranged upstream of an imaging device in order to prevent saturation, it is difficult to ensure information regarding gradations in a low-brightness portion of a subject.

The present invention is made in consideration of the above-described circumstances and it is desirable to appropriately image a subject having a high-brightness portion and a low-brightness portion.

According to an embodiment of the present invention, an image processing apparatus includes the following elements. An imaging device converts light incident on the imaging device into charge. A determining unit determines for each pixel of the imaging device whether an accumulated charge of the pixel reaches a predetermined threshold charge within a shutter period elapsed from its start point when entrance of light incident on the imaging device is started to its end point when the entrance of incident light is terminated. A measuring unit measures a threshold arrival period elapsed until the charge reaches the threshold charge. A memory unit stores at least the threshold arrival period of a pixel for which the determining unit determines that a charge of the pixel reaches the threshold charge. An arithmetic unit calculates a charge to be accumulated by incident light in the shutter period on the basis of the threshold arrival period stored in the memory unit and the threshold charge. A generating unit generates an imaging signal using a pixel value corresponding to the charge calculated by the arithmetic unit as a pixel value of the pixel for which the determining unit determines that the charge reaches the threshold charge.

The memory unit may store a value obtained by analog-to-digital conversion of charge accumulated in a pixel, for which the determining unit determines that a charge of the pixel does not reach the threshold charge, at the termination of the shutter period. The generating unit may generate an imaging signal using a pixel value corresponding to the value stored in the memory unit as a pixel value of the pixel for which the determining unit determines that the charge does not reach the threshold charge.

The threshold charge may be the charge capacitance of each pixel of the imaging device.

The threshold charge may change such that a charge of each pixel of the imaging device reaches the threshold charge in the shutter period.

The memory unit may store a charge, obtained by analog-to-digital conversion of charge accumulated in a pixel for which the determining unit determines that a charge of the pixel reaches the threshold charge, in association with the threshold arrival period. The arithmetic unit may calculate a charge to be accumulated by incident light in the shutter period on the basis of the charge and the threshold arrival time stored in association with each other in the memory unit.

When the threshold charge gradually decreases to zero from the charge capacitance of each pixel in the shutter period, a charge to be accumulated by incident light in the shutter period may be calculated on the basis of the threshold arrival period stored in the memory unit and the threshold charge corresponding to the threshold arrival period in the change of the threshold charge.

The determining unit, the measuring unit, and the memory unit may be provided for each pixel of the imaging device.

According to another embodiment of the present invention, there is provided a method of image processing for generating imaging signals using charge accumulated in an imaging device. The method includes the steps of determining for each pixel of the imaging device whether an accumulated charge of the pixel reaches a predetermined threshold charge within a shutter period elapsed from its start point when entrance of light incident on the imaging device is started to its end point when the entrance of incident light is terminated, measuring a threshold arrival period elapsed until the charge reaches the threshold charge, storing at least the threshold arrival period of a pixel for which it is determined that a charge of the pixel reaches the threshold charge, calculating a charge to be accumulated by incident light in the shutter period on the basis of the stored threshold arrival period and the threshold charge, and generating an imaging signal using a pixel value corresponding to the calculated charge as a pixel value of the pixel for which it is determined that the charge reaches the threshold charge.

According to another embodiment of the present invention, there is provided a program that allows a computer to execute image processing for generating imaging signals using charge accumulated in an imaging device. The program includes the steps of determining for each pixel of the imaging device whether an accumulated charge of the pixel reaches a predetermined threshold charge within a shutter period elapsed from its start point when entrance of light incident on the imaging device is started to its end point when the entrance of incident light is terminated, measuring a threshold arrival period elapsed until the charge reaches the threshold charge, storing at least the threshold arrival period of a pixel for which it is determined that a charge of the pixel reaches the threshold charge, calculating a charge to be accumulated by incident light in the shutter period on the basis of the stored threshold arrival period and the threshold charge, and generating an imaging signal using a pixel value corresponding to the calculated charge as a pixel value of the pixel for which it is determined that the charge reaches the threshold charge.

In the apparatus, the method, and the program according to the above-described embodiments, it is determined for each pixel of the imaging device whether an accumulated charge of the pixel reaches a predetermined threshold charge within a shutter period elapsed from its start point when entrance of light incident on the imaging device is started to its end point when the entrance of incident light is terminated. A threshold arrival period elapsed until the charge reaches the threshold charge is measured. At least the threshold arrival period of a pixel for which it is determined that a charge of the pixel reaches the threshold charge is stored. A charge to be accumulated by incident light in the shutter period is calculated on the basis of the stored threshold arrival period and the threshold charge. An imaging signal is generated using a pixel value corresponding to the calculated charge as a pixel value of the pixel for which it is determined that the charge reaches the threshold charge.

According to another embodiment of the present invention, an image processing apparatus includes the following elements. An imaging device converts light incident on the imaging device into charge. A determining unit determines for each pixel of the imaging device whether an accumulated charge of the pixel reaches a predetermined threshold charge within a shutter period elapsed from its start point when entrance of light incident on the imaging device is started to its end point when the entrance of incident light is terminated. A pixel control unit eliminates charge accumulated in a pixel when a charge of the pixel reaches the threshold charge. A measuring unit counts for each pixel the number of charge eliminations by the pixel control unit in the shutter period. A memory unit stores for each pixel a charge obtained by analog-to-digital conversion of charge accumulated in the pixel at the termination of the shutter period and the number of charge eliminations counted by the measuring unit. An arithmetic unit calculates for each pixel a charge to be accumulated by incident light in the shutter period on the basis of a value indicating the charge and the number of charge eliminations stored in the memory unit. A generating unit generates an imaging signal for each pixel using a pixel value corresponding to the charge calculated by the calculating unit.

According to another embodiment of the present invention, there is provided a method of image processing for generating imaging signals using charge accumulated in an imaging device. The method includes the steps of determining for each pixel of the imaging device whether an accumulated charge of the pixel reaches a predetermined threshold charge within a shutter period elapsed from its start point when entrance of light incident on the imaging device is started to its end point when the entrance of incident light is terminated, eliminating charge accumulated in a pixel when a charge of the pixel reaches the threshold charge, counting for each pixel the number of charge eliminations in the shutter period, storing for each pixel a charge obtained by analog-to-digital conversion of charge accumulated in the pixel at the termination of the shutter period and the counted number of charge eliminations, calculating for each pixel a charge to be accumulated by incident light in the shutter period on the basis of a value indicating the stored charge and the stored number of charge eliminations, and generating an imaging signal for each pixel using a pixel value corresponding to the calculated charge.

According to another embodiment of the present invention, there is provided a program that allows a computer to execute image processing for generating imaging signals using charge accumulated in an imaging device. The program includes the steps of determining for each pixel of the imaging device whether an accumulated charge of the pixel reaches a predetermined threshold charge within a shutter period elapsed from its start point when entrance of light incident on the imaging device is started to its end point when the entrance of incident light is terminated, eliminating charge accumulated in a pixel when a charge of the pixel reaches the threshold charge, counting for each pixel the number of charge eliminations in the shutter period, storing for each pixel a charge obtained by analog-to-digital conversion of charge accumulated in the pixel at the termination of the shutter period and the counted number of charge eliminations, calculating for each pixel a charge to be accumulated by incident light in the shutter period on the basis of a value indicating the stored charge and the stored number of charge eliminations, and generating an imaging signal for each pixel using a pixel value corresponding to the calculated charge.

In the apparatus, the method, and the program according to the above-described embodiments, it is determined for each pixel of the imaging device whether an accumulated charge of the pixel reaches a predetermined threshold charge within a shutter period elapsed from its start point when entrance of light incident on the imaging device is started to its end point when the entrance of incident light is terminated. When a charge of a pixel reaches the threshold charge, charge accumulated in the pixel is eliminated. The number of charge eliminations in the shutter period is counted for each pixel. A charge obtained by analog-to-digital conversion of charge accumulated in the pixel at the termination of the shutter period and the counted number of charge eliminations are stored for each pixel. A charge to be accumulated by incident light in the shutter period is calculated for each pixel on the basis of a value indicating the stored charge and the stored number of charge eliminations. An imaging signal for each pixel is generated using a pixel value corresponding to the calculated charge.

According to those embodiments of the present invention, a subject having a high-brightness portion and a low-brightness portion can be appropriately imaged.

BRIEF DESCRIPTION OF THE DRAWINGS

FIG. 9 is a flowchart of another process of generating imaging signals;

FIG. 10 is a flowchart of another memory control procedure;

DESCRIPTION OF THE PREFERRED EMBODIMENTS

Figure 1:
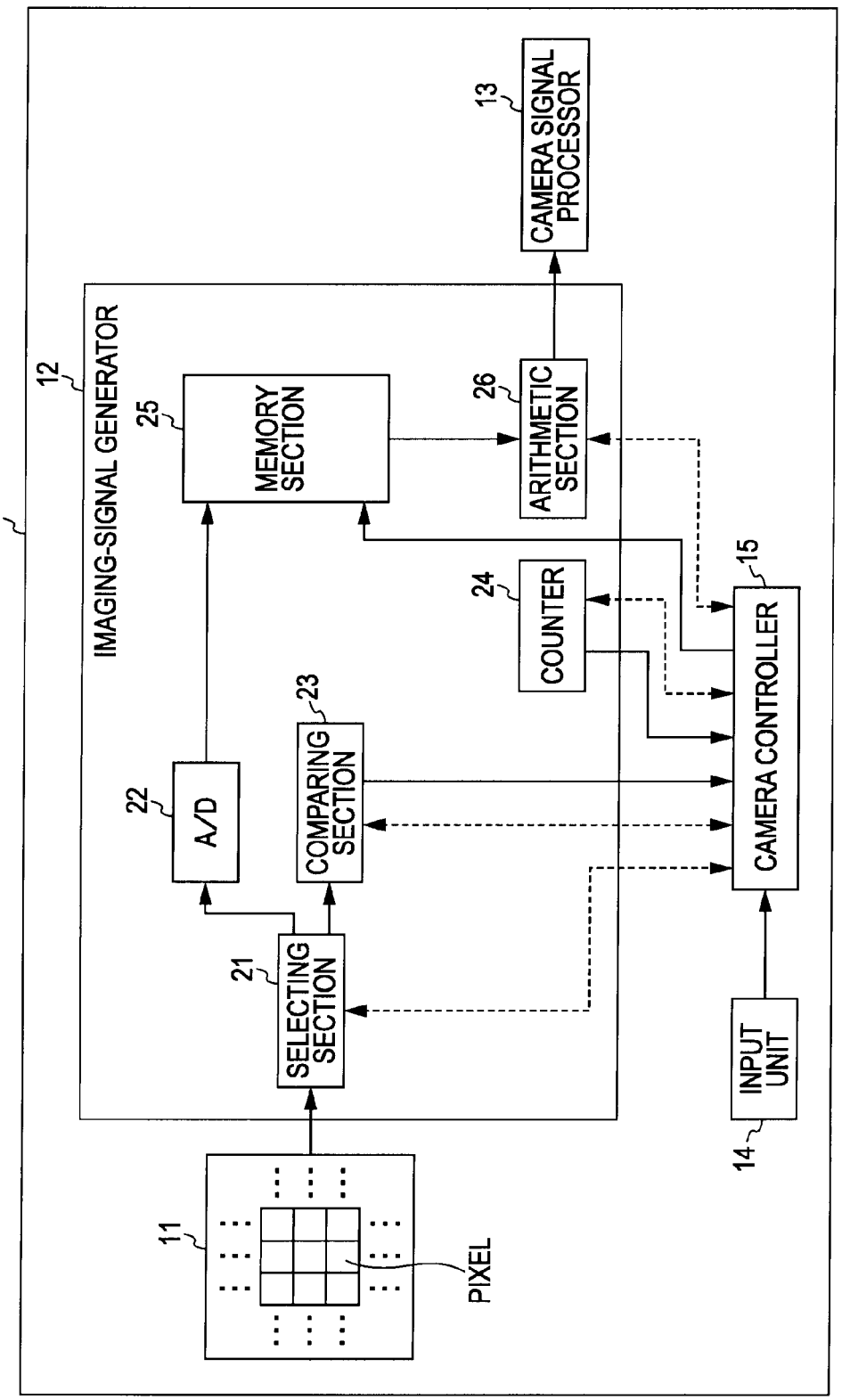
FIG. 1 is a block diagram of a video camera 1 according to an embodiment of the present invention.

Before describing an embodiment of the present invention, the correspondence between the features of the present invention and the specific elements disclosed in an embodiment of the present invention and the drawings is discussed below. This description is intended to assure that embodiments supporting the claimed invention are described in this specification and the drawings. Thus, even if an element in the following embodiments or the drawings is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

According to an embodiment of the present invention, an image processing apparatus includes the following elements. An imaging device (e.g., an imaging device 11 in FIG. 1) converts light incident on the imaging device into charge. A determining unit (e.g., a comparing section 23 in FIG. 1) determines for each pixel of the imaging device whether an accumulated charge of the pixel reaches a predetermined threshold charge (e.g., a charge $Q_t$ in FIG. 2) within a shutter period elapsed from its start point when entrance of light incident on the imaging device is started to its end point when the entrance of incident light is terminated. A measuring unit (e.g., a camera controller 15 in FIG. 1) measures a threshold arrival period (e.g., a period $T_{qt}$ in FIG. 1) elapsed until the charge reaches the threshold charge. A memory unit (e.g., a memory section 25 in FIG. 1) stores at least the threshold arrival period of a pixel for which the determining unit determines that a charge of the pixel reaches the threshold charge. An arithmetic unit (e.g., an arithmetic section 26 in FIG. 1) calculates a charge to be accumulated by incident light in the shutter period (e.g., a period $T_s$ in FIG. 2) on the basis of the threshold arrival period stored in the memory unit and the threshold charge. A generating unit (e.g., the arithmetic section 26 in FIG. 1) generates an imaging signal using a pixel value corresponding to the charge calculated by the arithmetic unit as a pixel value of the pixel for which the determining means determines that the charge reaches the threshold charge.

The memory unit stores a value (e.g., a charge $Q_e$ in FIG. 2) obtained by analog-to-digital conversion of charge accumulated in a pixel, for which the determining unit determines that a charge of the pixel does not reach the threshold charge, at the termination of the shutter period. The generating unit generates an imaging signal using a pixel value corresponding to the value stored in the memory unit as a pixel value of the pixel for which the determining unit determines that the charge does not reach the threshold charge.

The threshold charge may be the charge capacitance (e.g., a charge $Q_o$ in FIG. 2) of each pixel of the imaging device.

Figure 4:
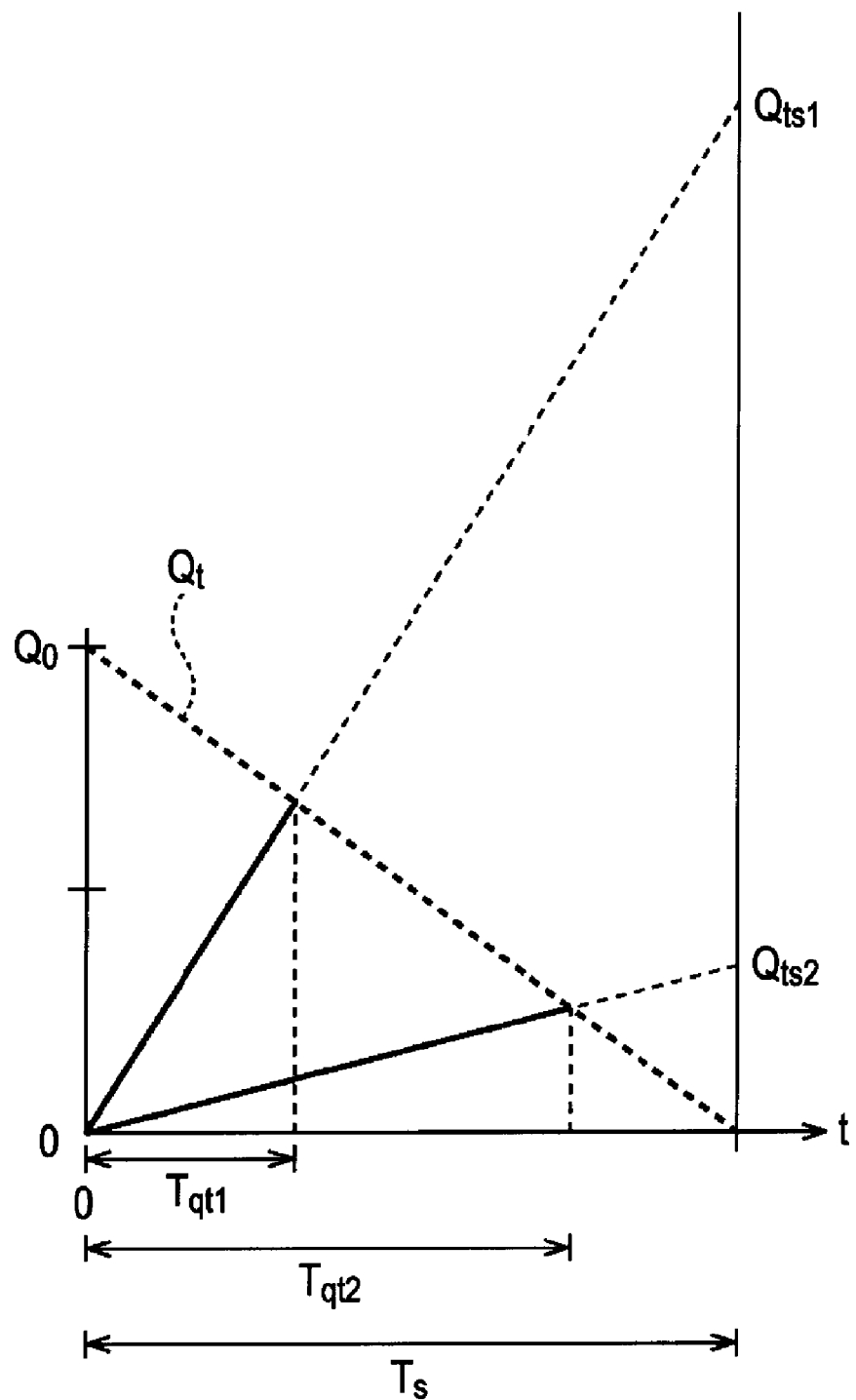
FIG. 4 is a diagram explaining the principle of another process of generating imaging signals.

The threshold charge may change such that a charge of each pixel of the imaging device reaches the threshold charge in the shutter period (for example, like a threshold charge $Q_t$ in FIG. 4).

The memory unit may store a charge (e.g., the threshold charge $Q_t$ in FIG. 2), obtained by analog-to-digital conversion of charge accumulated in a pixel for which the determining unit determines that a charge of the pixel reaches the threshold charge, in association with the threshold arrival period. The arithmetic unit may calculate a charge to be accumulated by incident light in the shutter period on the basis of the charge and the threshold arrival time stored in association with each other in the memory unit.

When the threshold charge gradually decreases to zero from the charge capacitance of each pixel in the shutter period, a charge to be accumulated by incident light in the shutter period may be calculated (using, for example, Expression (3)) on the basis of the threshold arrival period stored in the memory unit and the threshold charge corresponding to the threshold arrival period in the change of the threshold charge.

The determining unit (e.g., a comparing section 53 in FIG. 6), the measuring unit (e.g., a control section 55 in FIG. 6), and the memory unit (e.g., a memory section 54 in FIG. 6) may be provided for each pixel of the imaging device.

According to another embodiment of the present invention, there is provided a method of image processing for generating imaging signals using charge accumulated in an imaging device. The method includes the steps of determining for each pixel of the imaging device whether an accumulated charge of the pixel reaches a predetermined threshold charge within a shutter period elapsed from its start point when entrance of light incident on the imaging device is started to its end point when the entrance of incident light is terminated (for example, step S3 in FIG. 3), measuring a threshold arrival period elapsed until the charge reaches the threshold charge (for example, step S4 in FIG. 3), storing at least the threshold arrival period of a pixel for which it is determined that a charge of the pixel reaches the threshold charge (for example, step S4 in FIG. 3), calculating a charge to be accumulated by incident light in the shutter period on the basis of the stored threshold arrival period and the threshold charge (for example, step S8 in FIG. 3), and generating an imaging signal using a pixel value corresponding to the calculated charge as a pixel value of the pixel for which it is determined that the charge reaches the threshold charge (for example, step S8 in FIG. 3).

According to another embodiment of the present invention, there is provided a program that allows a computer to execute image processing for generating imaging signals using charge accumulated in an imaging device. The program includes the steps of determining for each pixel of the imaging device whether an accumulated charge of the pixel reaches a predetermined threshold charge within a shutter period elapsed from its start point when entrance of light incident on the imaging device is started to its end point when the entrance of incident light is terminated (for example, step S3 in FIG. 3), measuring a threshold arrival period elapsed until the charge reaches the threshold charge (for example, step S4 in FIG. 3), storing at least the threshold arrival period of a pixel for which it is determined that a charge of the pixel reaches the threshold charge (for example, step S4 in FIG. 3), calculating a charge to be accumulated by incident light in the shutter period on the basis of the stored threshold arrival period and the threshold charge (for example, step S8 in FIG. 3), and generating an imaging signal using a pixel value corresponding to the calculated charge as a pixel value of the pixel for which it is determined that the charge reaches the threshold charge (for example, step S8 in FIG. 3).

According to another embodiment of the present invention, an image processing apparatus includes the following elements. An imaging device (e.g., an imaging device 11 in FIG. 14) converts light incident on the imaging device into charge. A determining unit (for example, a comparing section 73 in FIG. 14) determines for each pixel of the imaging device whether an accumulated charge of the pixel reaches a predetermined threshold charge within a shutter period elapsed from its start point when entrance of light incident on the imaging device is started to its end point when the entrance of incident light is terminated. A pixel control unit (e.g., a camera controller 62 and an A/D converting section 72 in FIG. 14) eliminates charge accumulated in a pixel when a charge of the pixel reaches the threshold charge. A measuring unit (e.g., a camera controller 62 in FIG. 14) counts for each pixel the number of charge eliminations by the pixel control unit in the shutter period. A memory unit (e.g., a memory section 75 in FIG. 14) stores for each pixel a charge obtained by analog-to-digital conversion of charge accumulated in the pixel at the termination of the shutter period and the number of charge eliminations counted by the measuring unit. An arithmetic unit (e.g., an arithmetic section 76) calculates for each pixel a charge to be accumulated by incident light in the shutter period on the basis of a value indicating the charge of the pixel and the number of charge eliminations stored in the memory unit. A generating unit (e.g., the arithmetic section 76 in FIG. 14) generates an imaging signal for each pixel using a pixel value corresponding to the charge calculated by the calculating unit.

According to another embodiment of the present invention, there is provided a method of image processing for generating imaging signals using charge accumulated in an imaging device. The method includes the steps of determining for each pixel of the imaging device whether an accumulated charge of the pixel reaches a predetermined threshold charge within a shutter period elapsed from its start point when entrance of light incident on the imaging device is started to its end point when the entrance of incident light is terminated (for example, step S153 in FIG. 16), eliminating charge accumulated in a pixel when a charge of the pixel reaches the threshold charge (for example, step S154 in FIG. 16), counting for each pixel the number of charge eliminations in the shutter period (for example, step S154 in FIG. 16), storing for each pixel a charge obtained by analog-to-digital conversion of charge accumulated in the pixel at the termination of the shutter period and the counted number of charge eliminations (for example, step S156 in FIG. 16), calculating for each pixel a charge to be accumulated by incident light in the shutter period on the basis of a value indicating the stored charge of the pixel and the stored number of charge eliminations (for example, step S157 in FIG. 16), and generating an imaging signal for each pixel using a pixel value corresponding to the calculated charge (for example, step S157 in FIG. 16).

According to another embodiment of the present invention, there is provided a program that allows a computer to execute image processing for generating imaging signals using charge accumulated in an imaging device. The program includes the steps of determining for each pixel of the imaging device whether an accumulated charge of the pixel reaches a predetermined threshold charge within a shutter period elapsed from its start point when entrance of light incident on the imaging device is started to its end point when the entrance of incident light is terminated (for example, step S153 in FIG. 16), eliminating charge accumulated in a pixel when a charge of the pixel reaches the threshold charge (for example, step S154 in FIG. 16), counting for each pixel the number of charge eliminations in the shutter period (for example, step S154 in FIG. 16), storing for each pixel a charge obtained by analog-to-digital conversion of charge accumulated in the pixel at the termination of the shutter period and the counted number of charge eliminations (for example, step S156 in FIG. 16), calculating for each pixel a charge to be accumulated by incident light in the shutter period on the basis of a value indicating the stored charge of the pixel and the stored number of charge eliminations (for example, step S157 in FIG. 16), and generating an imaging signal for each pixel using a pixel value corresponding to the calculated charge (for example, step S157 in FIG. 16).

FIG. 1 illustrates the structure of a video camera 1 according to an embodiment of the present invention.

An imaging device 11 includes, for example, a complementary metal oxide semiconductor (CMOS) image sensor capable of reading an electronic signal from each unit cell that corresponds to a pixel of a subject image. The imaging device 11 converts an optical image (image of a subject) formed by light passing through a lens block (not shown) into an electrical signal in each pixel and outputs the resultant signal (charge) to an imaging-signal generator 12.

The imaging-signal generator 12 generates imaging signals from the signals supplied from the imaging device 11 in accordance with the control of a camera controller 15 and outputs the generated imaging signals to a camera signal processor 13.

The camera signal processor 13 performs sampling and YC separation on the imaging signals supplied from the imaging-signal generator 12 and outputs obtained luminance signals and chrominance signals. The signals output from the camera signal processor 13 are supplied to a display (not shown) so that a video image based on the signals is displayed and are output to a removable medium (not shown) so that data based on the signals is recorded on the medium.

An input unit 14 outputs instruction signals corresponding to user operations on various buttons for operating the video camera 1 to the camera controller 15.

The camera controller 15 controls respective components of the video camera 1 in accordance with the instruction signals from the input unit 14.

The imaging-signal generator 12 will now be described in detail below. First, the principle of imaging-signal generation by the imaging-signal generator 12 will be described.

When a subject has a high-brightness portion, the amount of charge (hereinafter, simply referred to as a charge), which is accumulated in each of pixels of the imaging device 11 corresponding to the high-brightness portion for a period of time (hereinafter, a shutter period) from its start point when entrance of light incident on the imaging device 11 is started to its end point when the entrance of incident light is terminated, may reach the charge capacitance of the pixel, i.e., the limit amount of charge (hereinafter, a limit charge) that can be accumulated in the pixel. In this case, the charge accumulated in the pixel becomes saturated and the pixel does not accumulate more charge.

Figure 2:
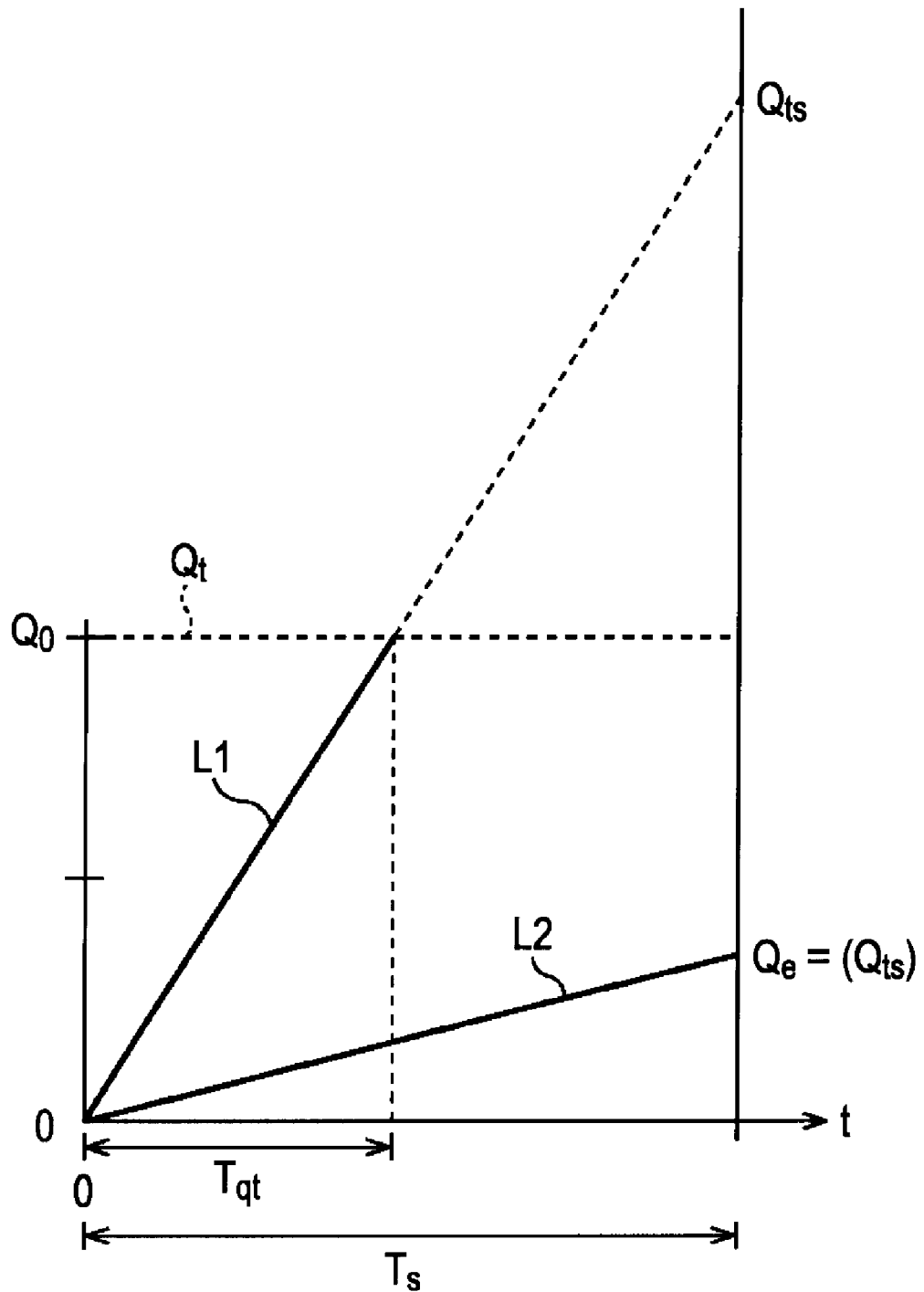
FIG. 2 is a diagram explaining the principle of a process of generating imaging signals.

However, charge accumulation increases linearly, as shown by a line L1 in FIG. 2, until charge becomes saturated. The imaging-signal generator 12 sets a value equivalent to a limit charge $Q_o$ as a threshold charge $Q_t$ and determines whether a charge of a pixel in the imaging device 11 reaches the threshold charge $Q_t$ within a shutter period (e.g., ⅟60 seconds) $T_s$. If the charge reaches the threshold charge $Q_t$, the imaging-signal generator 12 calculates a charge $Q_{ts}$ that can be accumulated in the shutter period $T_s$ (hereinafter, referred to as a charge $Q_{ts}$ to be accumulated in the shutter period $T_s$) of the pixel on the assumption that the pixel has a charge capacitance exceeding the limit charge $Q_0$ using Expression (1).

$$Q_{ts} = Q_t \times \frac{T_s}{T_{qt}} \quad (1)$$

where $Q_t$ denotes the threshold charge, which is equivalent to the limit charge $Q_o$ in this case, $T_{qt}$ indicates a period of time (hereinafter, a threshold arrival period) elapsed until the charge reaches the threshold charge $Q_t$, and $T_s$ denotes the shutter period.

As for a pixel whose charge does not reach the threshold charge $Q_t$ (=the limit charge $Q_o$) within the shutter period $T_s$ as shown by a line L2 in FIG. 2, an actual charge $Q_e$ at the termination of the shutter period $T_s$ is set to the charge $Q_{ts}$ accumulated in the shutter period $T_s$.

Pixel values corresponding to the charges $Q_{ts}$, determined in the above-described manner, constitute one frame. Therefore, imaging signals of one frame are generated.

According to this embodiment, even if charge exceeding the limit charge is accumulated in a pixel within the shutter period during shooting an image (a moving image or a still image), a charge that can be accumulated in the shutter period is estimated. Consequently, the sensitivity or dynamic range of the imaging device 11 can be held irrespective of the limit charge $Q_o$ of each pixel. Advantageously, information regarding gradations of an image can be kept in a wide brightness range from a lower brightness portion to a higher brightness portion of a subject.

The structure of the imaging-signal generator 12 will be described with reference to FIG. 1.

A selecting section 21 sequentially selects pixels of the imaging device 11 one at a time and supplies a signal (e.g., a voltage signal) corresponding to the magnitude of charge accumulated in the selected pixel to the image memory 23.

When receiving an instruction from the camera controller 15, the selecting section 21 outputs charge accumulated in the currently selected pixel to an A/D converting section 22. When the charge accumulated in the pixel is output, the pixel has a charge of 0.

The A/D converting section 22 converts charge that is an analog signal supplied from the selecting section 21 into a digital signal indicating a value of the amount of charge (hereinafter, simply referred to as a charge) and supplies the resultant signal to a memory section 25.

A comparing section 23 determines whether charge accumulated in the selected pixel is saturated on the basis of a signal supplied from the selecting section 21. For example, when determining that the charge is saturated, the comparing section 23 supplies a signal indicative of the determination to the camera controller 15.

Specifically, the comparing section 23 holds the threshold charge $Q_t$ equivalent to the limit charge $Q_o$ and compares the threshold charge $Q_t$ with a charge obtained from the signal supplied from the selecting section 21. For example, when the charge is equal to or larger than the threshold charge $Q_t$, the comparing section 23 supplies a signal indicative of the fact to the camera controller 15.

In this case, it is assumed that the camera controller 15 sets the threshold charge $Q_t$ in the comparing section 23.

A counter 24 measures a period of time by counting with accuracy enough for quantization steps necessary for expression of gradations of an image. The counter 24 starts counting in accordance with the control of the camera controller 15 and supplies a count to, for example, the camera controller 15.

The memory section 25 stores a charge supplied from the A/D converting section 22 and a count supplied from the camera controller 15 such that the charge is associated with the count. In the following description, a charge and a count stored in the memory section 25 in association with each other will be appropriately referred to as imaging information of the corresponding pixel that is being selected when the charge and count are obtained.

An arithmetic section 26 refers to imaging information of each pixel stored in the memory section 25 in accordance with the control of the camera controller 15. Regarding a pixel whose charge reaches the threshold charge $Q_t$ within the shutter period $T_s$, the arithmetic section 26 calculates the charge $Q_{ts}$ to be accumulated in the shutter period $T_s$ using Expression (1). On the other hand, regarding a pixel whose charge does not reach the threshold charge $Q_t$ in the shutter period $T_s$, the arithmetic section 26 sets the charge $Q_e$ at the termination of the shutter period to the charge $Q_{ts}$ accumulated in the shutter period $T_s$. The arithmetic section 26 forms one frame using pixel values corresponding to the obtained charges $Q_{ts}$ to generate imaging signals of one frame. The arithmetic section 26 supplies the generated imaging signals to the camera signal processor 13.

A process of generating imaging signals will now be described with reference to a flowchart shown in FIG. 3.

In step S1, measuring the shutter period $T_s$ is started. Specifically, the camera controller 15 outputs a counting start instruction to the counter 24 of the imaging-signal generator 12. The counter 24 starts counting and also starts outputting a count to the camera controller 15.

In step S2, the camera controller 15 controls the selecting section 21 of the imaging-signal generator 12 to select one pixel whose imaging information is not stored in step S4, which will be described later. The selecting section 21 selects one pixel (whose imaging information is not stored) designated by the camera controller 15 and starts to output a signal (voltage signal) indicating the magnitude of charge accumulated in the selected pixel to the comparing section 23.

The comparing section 23 obtains a charge of the currently selected pixel from the signal supplied from the selecting section 21 and determines whether the charge reaches the threshold charge $Q_t$. If the charge reaches the threshold charge $Q_t$, the comparing section 23 starts a procedure of supplying a signal indicating the fact to the camera controller 15.

In step S3, the camera controller 15 determines whether the charge of the currently selected pixel reaches the threshold charge $Q_t$. In this case, the camera controller 15 determines whether the signal indicating that the charge of the pixel reaches the threshold charge $Q_t$ is supplied from the comparing section 23.

If it is determined in step S3 that the charge of the currently selected pixel reaches the threshold charge $Q_t$, the process proceeds to step S4. In step S4, the charge (i.e., the threshold charge $Q_t$ (=the limit charge $Q_o$)) at that time and a threshold arrival period $T_{qt}$ elapsed after the start of the shutter period until the charge reaches the threshold charge $Q_t$ are stored as imaging information contained in the currently selected pixel.

Specifically, the camera controller 15 outputs a signal indicating a charge output instruction to the selecting section 21. In response to this signal, the selecting section 21 outputs charge accumulated in the currently selected pixel to the A/D converting section 22. The A/D converting section 22 outputs a value obtained by A/D conversion, i.e., a value corresponding to the threshold charge $Q_t$ (=limit charge $Q_o$) to the memory section 25. In this instance, the camera controller 15 supplies a count of the counter 24, i.e., the count corresponding to the threshold arrival period $T_{qt}$ to the memory section 25.

The memory section 25 stores the threshold charge $Q_t$ (=limit charge $Q_o$) supplied from the A/D converting section 22 and the threshold arrival period $T_{qt}$ supplied from the camera controller 15 such that the threshold charge $Q_t$ is associated with the threshold arrival period $T_{qt}$.

If it is determined in step S3 that the charge does not reach the threshold charge $Q_t$, the process proceeds to step S5 and it is determined whether the shutter period is terminated. Specifically, the camera controller 15 determines whether a count supplied from the counter 24 is identical to that obtained by counting the shutter period $T_s$.

When the imaging information is stored in the memory section 25 in step S4, alternatively, when it is determined in step S5 that the shutter period is not terminated, the process proceeds to step S6.

In step S6, the camera controller 15 determines whether a pixel whose imaging information is not stored in step S4 exists. If the camera controller 15 determines the presence of the pixel, the process is returned to step S2. In other words, a pixel whose imaging information is not stored in step S4 is newly selected and processing in steps S3 to S6 is similarly performed for the selected signal.

If it is determined in step S5 that the shutter period is terminated, the process proceeds to step S7. In step S7, the charge $Q_e$ at that time (i.e., at the termination of the shutter period) and the shutter period $T_s$ of each pixel whose imaging information is not stored in step S4 are stored as imaging information of the pixel in the memory section 25.

Specifically, the selecting section 21 sequentially selects pixels, whose imaging information is not stored in step S4, in accordance with the control of the camera controller 15. The A/D converting section 22 analog-to-digital converts charge accumulated in the currently selected pixel and outputs the resultant signal to the memory section 25. The camera controller 15 supplies a count obtained by counting the shutter period $T_s$ to the memory section 25. The memory section 25 stores the charge $Q_e$ of each pixel supplied from the A/D converting section 22 and the corresponding shutter period $T_s$ supplied from the camera controller 15 in association with each other.

When it is determined in step S6 that there is no pixel whose imaging information is not stored in step S4, alternatively, when the imaging information is stored in the memory section 25 in step S7, i.e., when imaging information blocks of all pixels of the imaging device 11 are stored in the memory section 25, the process proceeds to step S8. The camera controller 15 controls the arithmetic section 26 of the imaging-signal generator 12 to generate imaging signals of one frame on the basis of the imaging information blocks of the respective pixels stored in the memory section 25.

Specifically, when a charge (i.e., the charge $Q_e$) is stored in the memory section 25 as imaging information such that the charge is associated with a count indicating the shutter period $T_s$, the arithmetic section 26 sets the charge $Q_e$ to the charge $Q_{ts}$ accumulated in the shutter period $T_s$ of the pixel.

On the other hand, when a charge (i.e., the threshold charge $Q_t$ (=limit charge $Q_o$)) is stored in the memory section 25 as imaging information such that the charge is associated with a count indicating the threshold arrival period $T_{qt}$ (i.e., the count smaller than the count indicating the shutter period $T_s$), the arithmetic section 26 calculates Expression (1) using the threshold charge $Q_t$ (=limit charge $Q_o$) and the threshold arrival period $T_{qt}$ to obtain the charge $Q_{ts}$ to be accumulated in the shutter period $T_s$ of the pixel. It is assumed that the arithmetic section 26 stores the shutter period $T_s$ in advance.

The arithmetic section 26 forms one frame using pixel values corresponding to the charges $Q_{ts}$ determined in the above-described manner to generate imaging signals of one frame. The arithmetic section 26 supplies the generated imaging signals to the camera signal processor 13.

As described above, regarding a pixel in which charge is saturated within the shutter period $T_s$, a charge to be accumulated in the shutter period $T_s$ of the pixel is estimated. Consequently, the sensitivity or dynamic range of the imaging device 11 can be kept irrespective of the limit charge $Q_o$ of each pixel. Advantageously, information regarding gradations of an image in a wide brightness range from a lower brightness portion to a higher brightness portion of a subject can be prevented from being lost.

As described above, the threshold charge $Q_t$ is stored as imaging information in the memory section 25. Since the threshold charge $Q_t$ is the known limit charge $Q_0$ in this case, the threshold charge $Q_t$ may be held in the arithmetic section 26 without being stored as imaging information in the memory section 25 and the arithmetic section 26 may calculate Expression (1). Furthermore, it is unnecessary to store the shutter period $T_s$ as imaging information. The period $T_s$ stored in the arithmetic section 26 for calculation of Expression (1) may be used.

As described above, the threshold charge $Q_t$ is fixed to the limit charge $Q_o$ as shown in FIG. 2. The threshold charge $Q_t$ may be gradually changed as shown in FIG. 4.

Referring to FIG. 4, the threshold charge $Q_t$ gradually decreases from the limit charge $Q_o$ to zero within the shutter period $T_s$. In this case, since a charge of each pixel is certain to reach the threshold charge $Q_t$ within the shutter period $T_s$, the charge $Q_{ts}$ to be accumulated in the shutter period $T_s$ can be estimated for each pixel by calculating Expression (1) using the threshold charge $Q_t$ at that time and the threshold arrival period $T_{qt}$.

A process of generating imaging signals when the threshold charge $Q_t$ gradually varies as shown in FIG. 4 will now be described with reference to FIG. 5.

Figure 3:
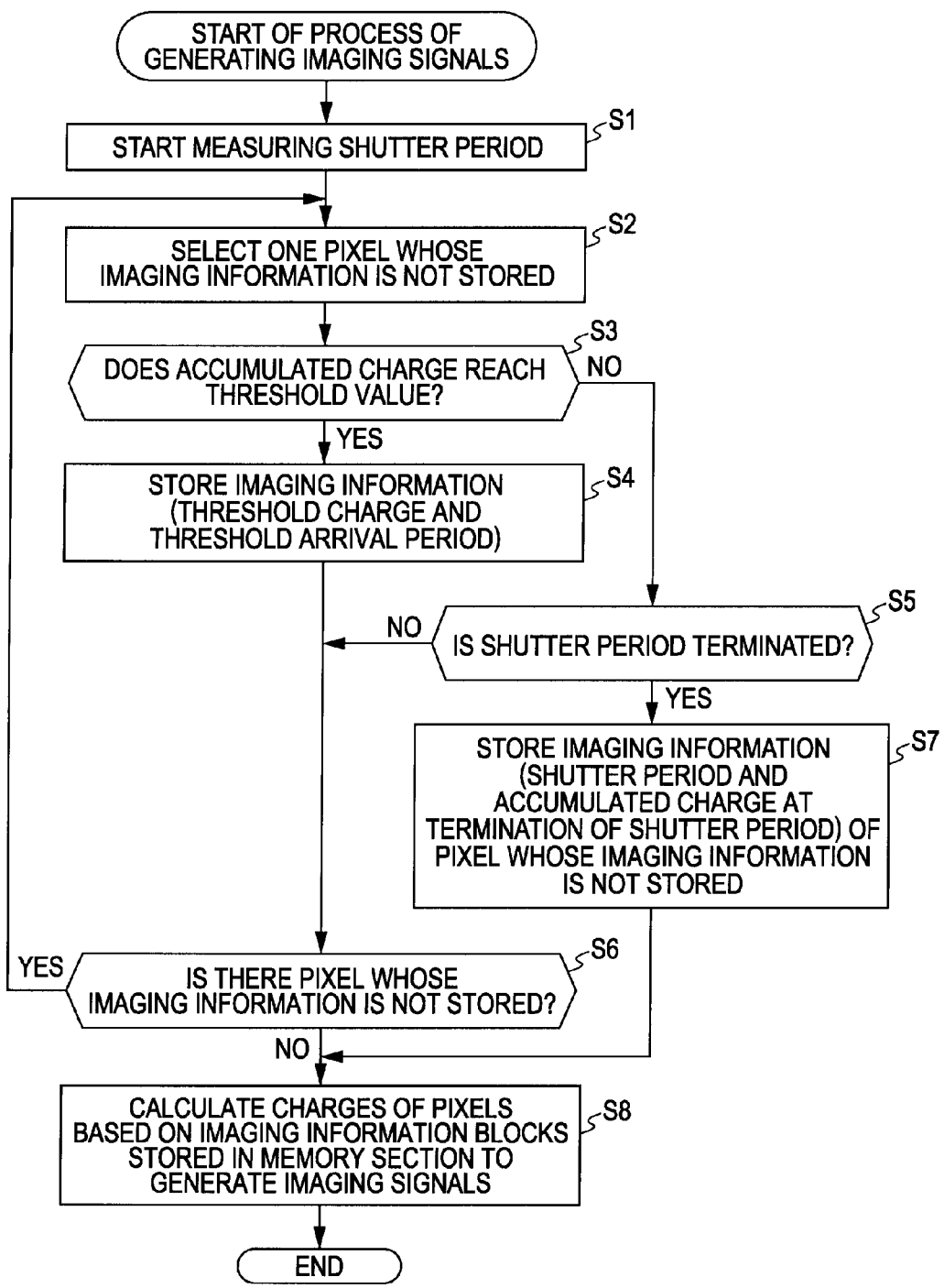
FIG. 3 is a flowchart of the process.

In step S11, measuring a shutter period is started in a manner similar to step S1 in FIG. 3.

In step S12, one pixel whose imaging information is not stored in step S14, which will be described below, is selected in the same way as step S2.

In step S13, whether a charge of the currently selected pixel reaches the threshold charge $Q_t$ at the current time is determined in the same way as step S3.

If it is determined in step S13 that the charge of the currently selected pixel reaches the current threshold charge $Q_t$, the process proceeds to step S14. In step S14, the current charge (i.e., the threshold charge $Q_t$) and threshold arrival period $T_{qt}$ are stored as imaging information contained in the currently selected pixel in the memory section 25 in a manner similar to step S4.

If it is determined in step S13 that the charge does not reach the current threshold charge $Q_t$, alternatively, when the imaging information of the currently selected pixel is stored in step S14, the process proceeds to step S15. In step S15, the camera controller 15 reduces the threshold charge $Q_t$ currently set in the comparing section 23 to the next lower level. In this instance, the amount of change in the threshold charge $Q_t$ and the timing of change are controlled so that the threshold charge $Q_t$ linearly decreases from the limit charge $Q_o$ to zero in the shutter period $T_s$ as shown in FIG. 4.

In step S16, the camera controller 15 determines whether there is a pixel whose imaging information is not stored in step S14. If the camera controller 15 determines that there is a pixel fitting the above-described condition, the process is returned to step S12. In other words, a pixel whose imaging information is not stored is newly selected in step S12 and processing in steps S13 to S16 is similarly performed for the selected pixel.

If it is determined in step S16 that there is no pixel whose imaging information is not stored, i.e., when imaging information blocks of all pixels are stored, the process proceeds to step S17. In step S17, the camera controller 15 controls the arithmetic section 26 in the imaging-signal generator 12 to generate imaging signals based on the imaging information blocks of the respective pixels stored in the memory section 25.

The arithmetic section 26 calculates Expression (1) using imaging information of each pixel stored in the memory section 25 to obtain the charge $Q_{ts}$ to be accumulated in the shutter period $T_s$ of the pixel.

The arithmetic section 26 forms one frame using pixel values corresponding to the charges $Q_{ts}$ obtained as described above to generate imaging signals of one frame. The arithmetic section 26 supplies the generated imaging signals to the camera signal processor 13.

The process of generating imaging signals in the arrangement of FIG. 1 on the condition that the threshold charge $Q_t$ gradually varies as shown in FIG. 4 is performed as described above.

Figure 6:
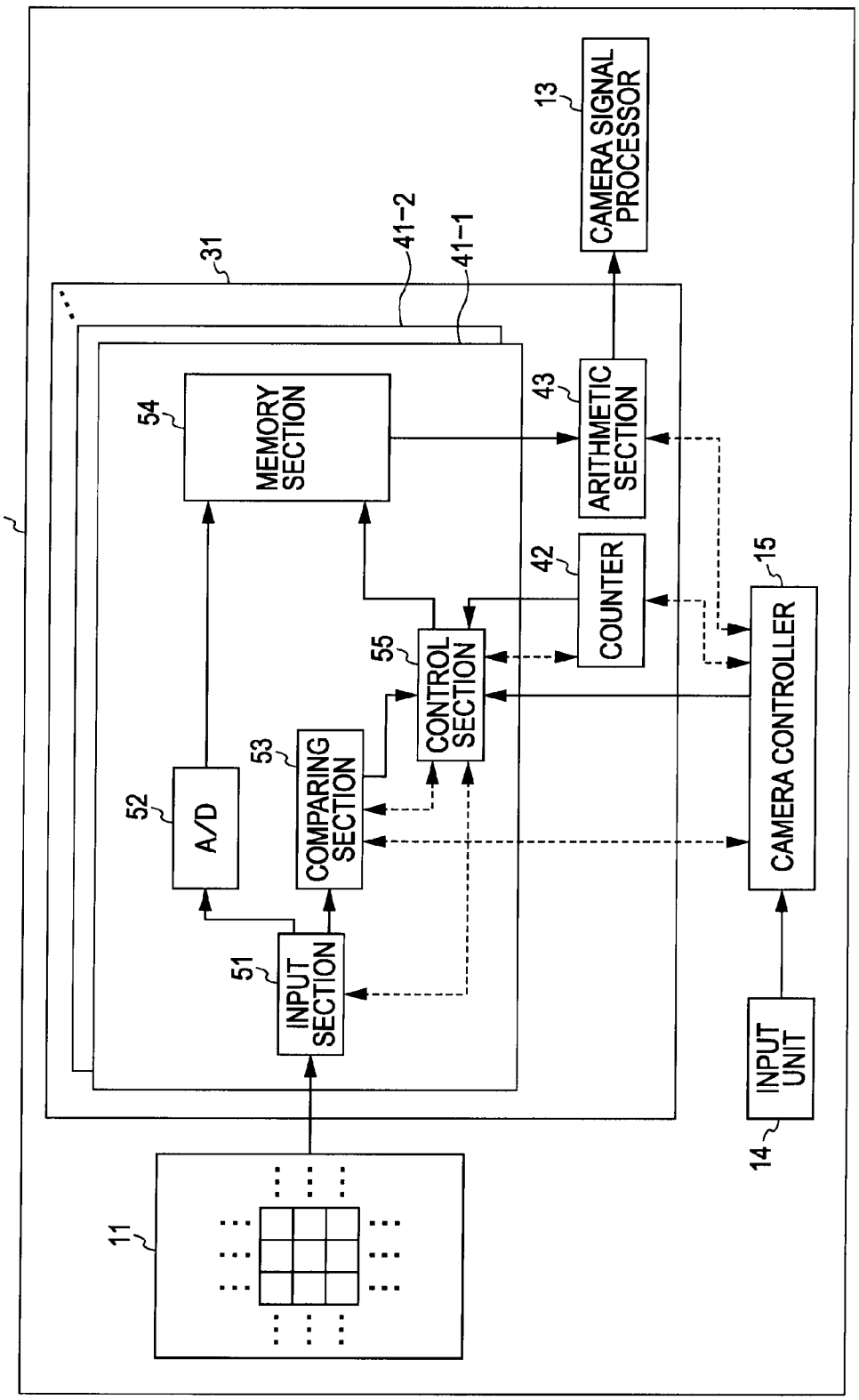
FIG. 6 is a block diagram of a video camera 1 according to another embodiment of the present invention.

FIG. 6 shows the structure of a video camera 1 according to another embodiment of the present invention. The video camera 1 includes an imaging-signal generator 31 instead of the imaging-signal generator 12 in the video camera 1 shown in FIG. 1.

The structure of the imaging-signal generator 31 will now be described.

Memory controllers 41-1, 41-2, . . . are provided for respective pixels of an imaging device 11. Each memory controller 41 sets a threshold charge $Q_t$ to a limit charge $Q_o$ and determines whether a charge of the corresponding pixel reaches the threshold charge $Q_t$ within a shutter period $T_s$. When determining that the charge reaches the threshold charge $Q_t$, the memory controller 41 stores the threshold charge $Q_t$ (=limit charge $Q_o$) and a threshold arrival period $T_{qt}$ as imaging information contained in the corresponding pixel. If the charge does not reach the threshold charge $Q_t$ in the shutter period $T_s$, the memory controller 41 stores a charge $Q_e$ at the termination of the shutter period and the shutter period $T_s$ as imaging information of the corresponding pixel.

A counter 42 can measure a period of time by counting with accuracy enough for quantization steps necessary for expression of gradations of an image in the same way as the counter 24 in FIG. 1. The counter 42 starts counting in accordance with the control of a camera controller 15 and supplies a count to the respective memory controllers 41 (specifically, control sections 55 thereof).

An arithmetic section 43 refers to imaging information of the pixel stored in each memory controller 41 (specifically, a memory section 54 thereof) in accordance with the control of the camera controller 15. Regarding a pixel whose charge reaches the threshold charge $Q_t$ within the shutter period $T_s$, the arithmetic section 43 calculates a charge $Q_{ts}$ to be accumulated in the shutter period $T_s$ using Expression (1). Regarding a pixel whose charge does not reach the threshold charge $Q_t$ in the shutter period $T_s$, the arithmetic section 43 sets a charge $Q_e$ at the termination of the shutter period to the charge $Q_{ts}$ accumulated in the shutter period $T_s$. The arithmetic section 43 forms one frame using pixel values corresponding to the charges $Q_{ts}$ obtained as described above to generate imaging signals of one frame. The arithmetic section 43 supplies the generated imaging signals to a camera signal processor 13.

The structure of each memory controller 41 of the imaging-signal generator 31 will now be described.

In each memory controller 41, an input section 51 supplies a signal (voltage signal) according to the magnitude of a charge of the corresponding pixel to a comparing section 53. In addition, the input section 51 supplies charge accumulated in the corresponding pixel to an A/D converting section 52 in response to an instruction from the control section 55. After the charge is output, the pixel has a charge of zero.

The A/D converting section 52 converts the charge that is an analog signal supplied from the input section 51 into a digital signal indicating a charge and outputs the resultant signal to the memory section 54.

On the basis of the signal supplied from the input section 51, the comparing section 53 determines whether the charge of the pixel corresponding to the memory controller 41 is saturated. For example, when determining that the charge is saturated, the comparing section 53 supplies a signal indicating the determination to the control section 55.

Specifically, the comparing section 53 holds the threshold charge $Q_t$ equivalent to the limit charge $Q_o$ and compares the threshold charge $Q_t$ with a charge obtained from the signal supplied from the input section 51. For example, when the charge is equal to or larger than the threshold charge $Q_t$, the comparing section 53 supplies a signal indicating the fact to the control section 55.

The memory section 54 stores the charge supplied from the A/D converting section 52 and a count supplied from the control section 55 as imaging information of the pixel corresponding to the memory controller 41.

The control section 55 controls the respective components of the corresponding memory controller 41.

A process of generating imaging signals by each memory controller 41 will now be described with reference to a flowchart of FIG. 7.

In step S51, measuring a shutter period is started in a manner similar to step S1 in FIG. 3.

In step S52, a memory control procedure is performed in each memory controller 41. The memory control procedure by the memory controller 41 will now be described with reference to a flowchart of FIG. 8.

In step S61, whether a charge of the corresponding pixel reaches the threshold charge $Q_t$ is determined. In this case, the control section 55 determines whether a signal indicating that the charge of the corresponding pixel reaches the threshold charge $Q_t$ is supplied from the comparing section 53.

If it is determined in step S61 that the charge of the corresponding pixel reaches the threshold charge $Q_t$, the procedure proceeds to step S62. In step S62, the charge at that time (i.e., the threshold charge $Q_t$ (=limit charge $Q_o$)) and the threshold arrival period $T_{qt}$ are stored as imaging information.

Specifically, the control section 55 outputs a signal indicating a charge output instruction to the input section 51. Consequently, the input section 51 supplies charge accumulated in the pixel corresponding to the memory controller 41 to the A/D converting section 52. The A/D converting section 52 outputs a value obtained by A/D conversion, i.e., the threshold charge $Q_t$ (=limit charge $Q_o$) to the memory section 54. The control section 55 supplies a count obtained by the counter 42, i.e., the count corresponding to the threshold arrival period $T_{qt}$ to the memory section 54.

The memory section 54 stores the threshold charge $Q_t$ (=limit charge $Q_o$) supplied from the A/D converting section 52 and the threshold arrival period $T_{qt}$ supplied from the control section 55 such that the threshold charge $Q_t$ is associated with the threshold arrival period $T_{qt}$.

If it is determined in step S61 that the charge does not reach the threshold charge $Q_t$, the procedure proceeds to step S63. In step S63, whether the shutter period is terminated is determined. Specifically, the control section 55 determines whether the count supplied from the counter 42 is the same as that obtained by counting the shutter period $T_s$.

If it is determined in step S63 that the shutter period is not terminated, the procedure is returned to step S61 and processing in step S61 and subsequent steps is similarly performed.

If it is determined in step S63 that the shutter period is terminated, the procedure proceeds to step S64. In step S64, the charge $Q_e$ of the corresponding pixel at the current time, i.e., at the termination of the shutter period and the shutter period $T_s$ are stored as imaging information in the memory section 54.

Specifically, charge currently accumulated in the corresponding pixel is supplied from the input section 51 to the A/D converting section 52 in accordance with the control of the control section 55. The charge is analog-to-digital converted and the obtained charge $Q_e$ is supplied to the memory section 54. A count obtained by counting the shutter period $T_s$ is supplied from the control section 55 to the memory section 54. The memory section 54 stores the charge $Q_e$ supplied from the A/D converting section 52 and the shutter period $T_s$ supplied from the control section 55 in association with each other.

Figure 7:
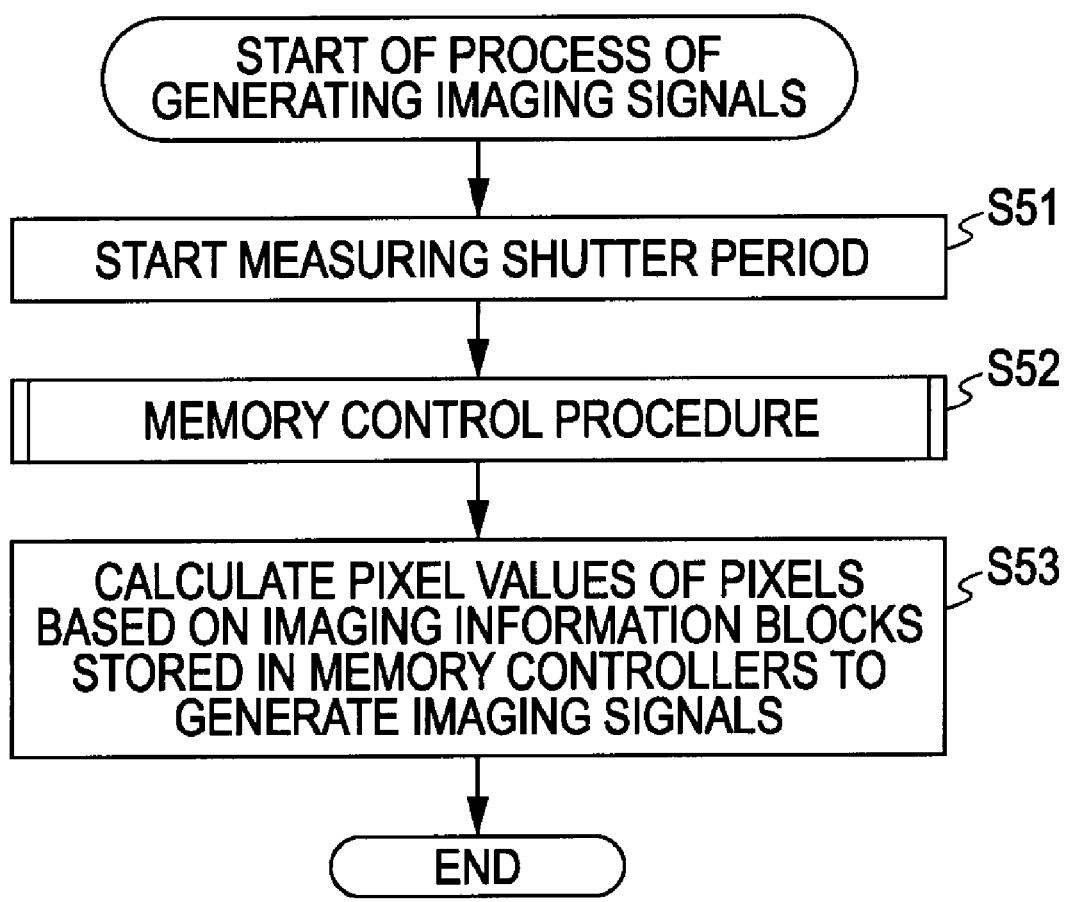
FIG. 7 is a flowchart of another process of generating imaging signals.

In each memory controller 41, after processing in step S62 or S64 is performed and imaging information of the corresponding pixel is stored, the procedure proceeds to step S53 in FIG. 7. In step S53, the camera controller 15 controls the arithmetic section 43 of the imaging-signal generator 31 to generate imaging signals on the basis of imaging information blocks stored in (the memory sections 54 of) the respective memory controllers 41.

When a charge (the charge $Q_e$) associated with a count indicating the shutter period $T_s$ is stored as imaging information in (the memory section 54 of) a certain memory controller 41, the arithmetic section 43 sets the charge $Q_e$ as a charge $Q_{ts}$ accumulated in the shutter period $T_s$ of the pixel corresponding to the memory controller 41.

When a charge (the threshold charge $Q_t$ (=limit charge $Q_o$) associated with a count (smaller than that indicating the shutter period $T_s$) indicating the threshold arrival period $T_{qt}$ is stored as imaging information in (the memory section 54 of) a certain memory controller 41, the arithmetic section 43 calculates Expression (1) using the threshold charge $Q_t$ (=limit charge $Q_o$) and the threshold arrival period $T_{qt}$ to obtain the charge $Q_{ts}$ to be accumulated in the shutter period $T_s$ of the pixel corresponding to the memory controller 41.

The arithmetic section 43 forms one frame using pixel values corresponding to the charges $Q_{ts}$ determined as described above to generate imaging signals of one frame and supplies the generated imaging signals to the camera signal processor 13.

The process of generating imaging signals in the arrangement of the memory controllers 41 corresponding to the respective pixels of the imaging device 11 is performed as described above.

In the above-described example shown in FIG. 6, the threshold charge $Q_t$ is fixed to the limit charge $Q_o$ as shown in FIG. 2. The threshold charge $Q_t$ may be gradually changed as shown FIG. 4.

A process of generating imaging signals by the imaging-signal generator 31 on the condition that the threshold charge $Q_t$ gradually varies as shown in FIG. 4 will now be described with reference to a flowchart of FIG. 9.

In step S71, measuring the shutter period is started in the same way as step S51 in FIG. 7.

In step S72, a memory control procedure is performed in each memory controller 41. The memory control procedure performed by each memory controller 41 will now be described with reference to a flowchart of FIG. 10.

Figure 8:
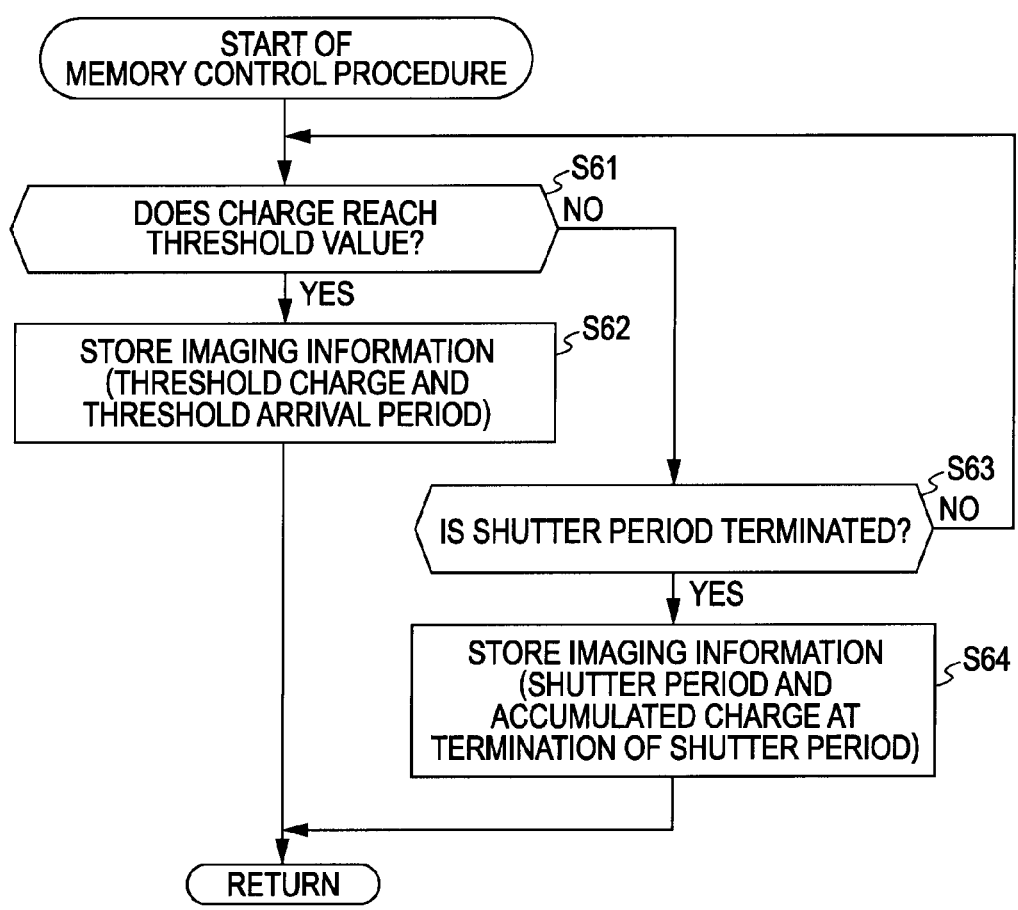
FIG. 8 is a flowchart of a memory control procedure.

In step S81, whether a charge of the corresponding pixel reaches the threshold charge $Q_t$ is determined in a manner similar to step S61 in FIG. 8.

If it is determined in step S81 that the charge of the corresponding pixel does not reach the threshold charge $Q_t$, the procedure proceeds to step S82. In step S82, the control section 55 of the memory controller 41 reduces the threshold charge $Q_t$ currently set in the comparing section 53 to the next lower level. In this instance, the threshold charge $Q_t$ is controlled to gradually decrease as shown in FIG. 4.

After that, the procedure is returned to step S81 and processing in step S81 and the subsequent step is similarly performed.

When it is determined in step S81 that the charge of the corresponding pixel reaches the threshold charge $Q_t$, the procedure proceeds to step S83. In step S83, the current charge (i.e., the threshold charge $Q_t$) of the corresponding pixel and the threshold arrival period $T_{qt}$ are stored as imaging information of the pixel in the memory section 54.

Since the threshold charge $Q_t$ gradually varies from the limit charge $Q_o$ to zero within the shutter period $T_s$ as shown in FIG. 4, the charge of the pixel corresponding to the memory controller 41 is certain to reach the threshold charge $Q_t$ within the shutter period $T_s$.

After processing in step S83 is performed in each memory controller 41 and imaging information blocks of respective pixels are stored, the process proceeds to step S73 in FIG. 9. The camera controller 15 controls the arithmetic section 43 of the imaging-signal generator 31 to generate imaging signals of one frame on the basis of the imaging information blocks of the respective pixels stored in (the memory sections 54 of) the respective memory controllers 41.

In this case, the arithmetic section 43 calculates Expression (1) using the threshold charge $Q_t$ and the threshold arrival period $T_{qt}$ stored as the imaging information to obtain the charge $Q_{ts}$ to be accumulated in the shutter period $T_s$ for each pixel.

The arithmetic section 43 forms one frame using pixel values corresponding to the charges $Q_{ts}$ obtained as described above to generate imaging signals of one frame and supplies the generated imaging signals to the camera signal processor 13.

The process of generating imaging signals in the arrangement of FIG. 6 in the case where the threshold charge $Q_t$ gradually varies as shown in FIG. 4 is performed as described above.

In the case where the threshold charge $Q_t$ gradually varies as shown in FIG. 4, Expression (1) is calculated as described above to obtain the charge $Q_{ts}$ to be accumulated in the shutter period $T_s$. In the case shown in FIG. 4, since the change in the threshold charge $Q_t$ can be expressed by the following Expression (2), a charge to be accumulated in the shutter period $T_s$ can be calculated using the following Expression (3).

$$Q_t = Q_o - \frac{Q_o}{T_s} T_{qt} \quad (2)$$

$$Q_{ts} = Q_o \left( \frac{T_s}{T_{qt}} - 1 \right) \quad (3)$$

Figure 11:
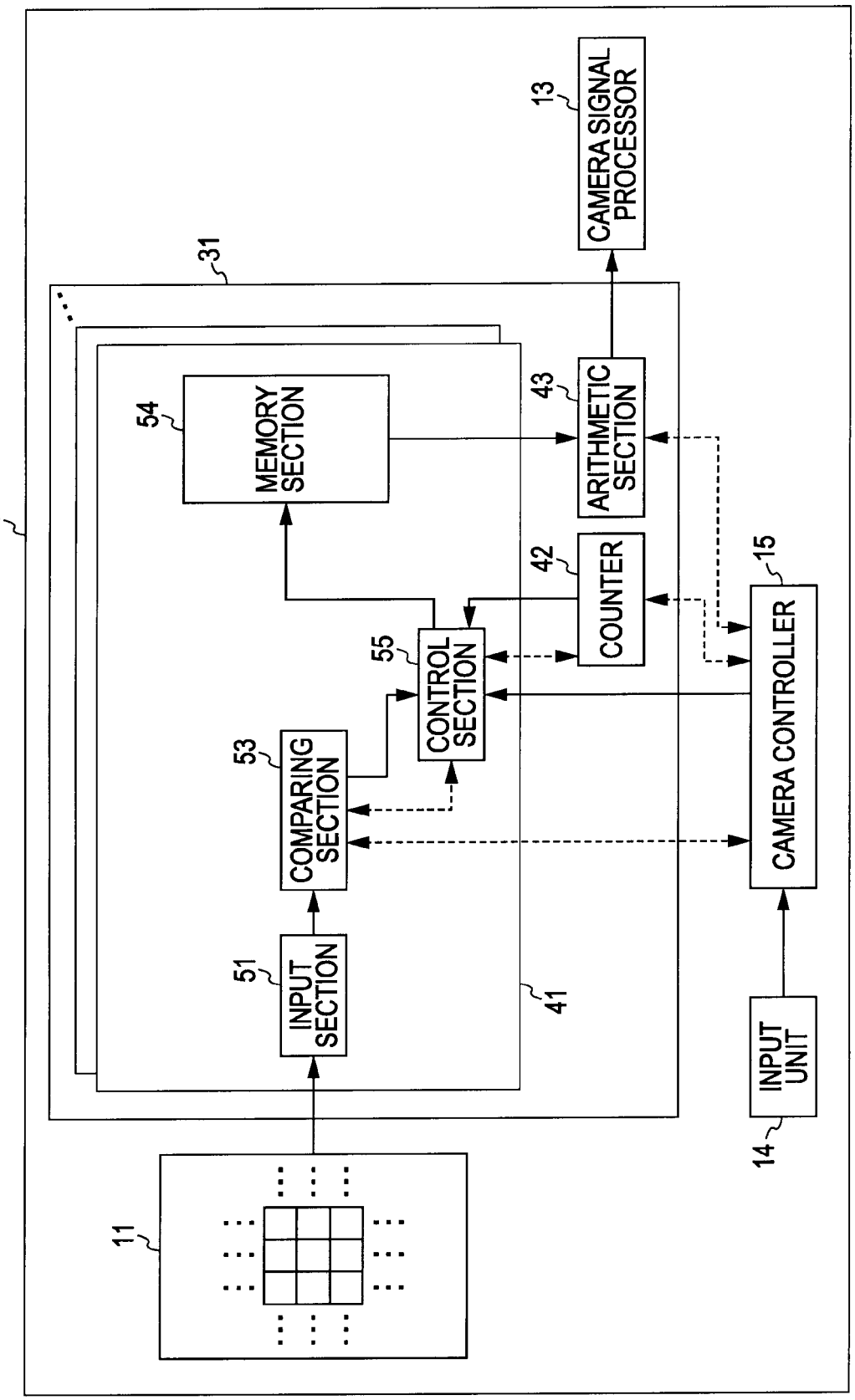
FIG. 11 is a block diagram of a video camera 1 according to another embodiment of the present invention.

In other words, since the limit charge $Q_0$ and the shutter period $T_s$ are known in this case, the charge $Q_{ts}$ can be estimated so long as the threshold arrival period $T_{qt}$ alone is stored. It is unnecessary to store the threshold charge $Q_t$ as imaging information, as different from the case using Expression (1). As shown in FIG. 11, therefore, the A/D converting section 52 can be omitted in each memory controller 41 of the imaging-signal generator 31 shown in FIG. 6. The A/D converting section 22 may also be omitted in the imaging-signal generator 12 shown in FIG. 1. This arrangement is not shown.

In the arrangement shown in FIG. 11 according to another embodiment, the memory section 54 of each memory controller 41 stores a count supplied from the control section 55 as imaging information of the pixel corresponding to the memory controller 41. The arithmetic section 43 calculates Expression (3) to obtain the charge $Q_{ts}$ to be accumulated in the shutter period $T_s$ for each pixel.

A process of generating imaging signals by the imaging-signal generator 31 shown in FIG. 11 will now be described with reference to a flowchart of FIG. 12.

In step S101, measuring the shutter period is started in a manner similar to step S71 in FIG. 9.

Figure 13:
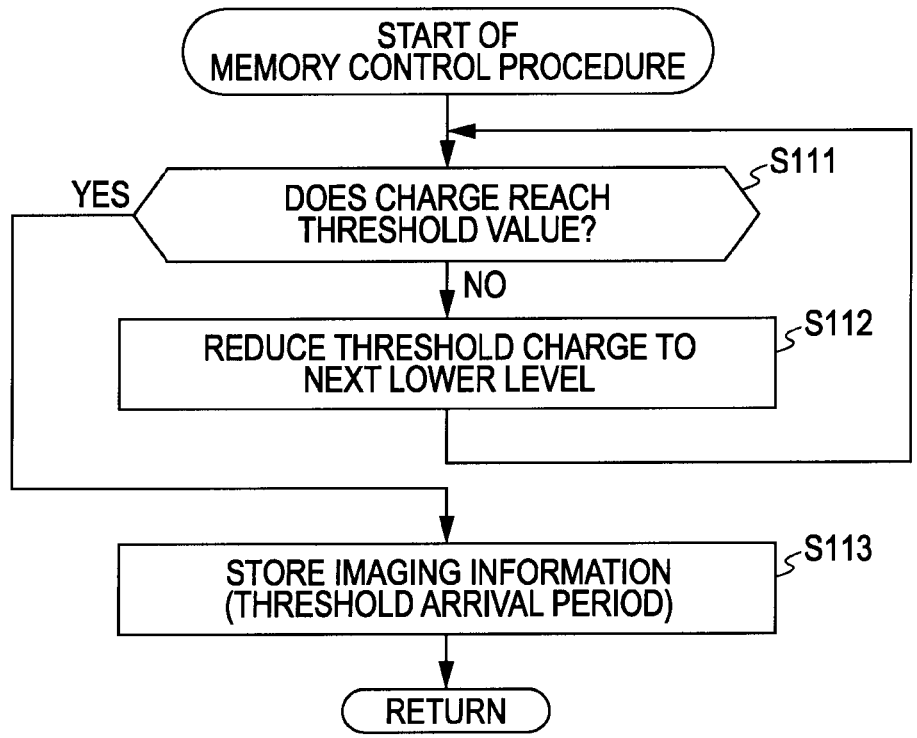
FIG. 13 is a flowchart of another memory control procedure.

In step S102, a memory control procedure is performed in each memory controller 41. The memory control procedure performed by each memory controller 41 will now be described with reference to a flowchart in FIG. 13.

Since the same processing as that in steps S81 and S82 in FIG. 10 is performed in steps S111 and S112, a description thereof will be omitted.

If it is determined in step S111 that a charge of the corresponding pixel reaches the threshold charge $Q_t$, the procedure proceeds to step S113. In step S113, the threshold arrival period $T_{qt}$ alone is stored as imaging information contained in the corresponding pixel into the memory section 54.

Figure 12:
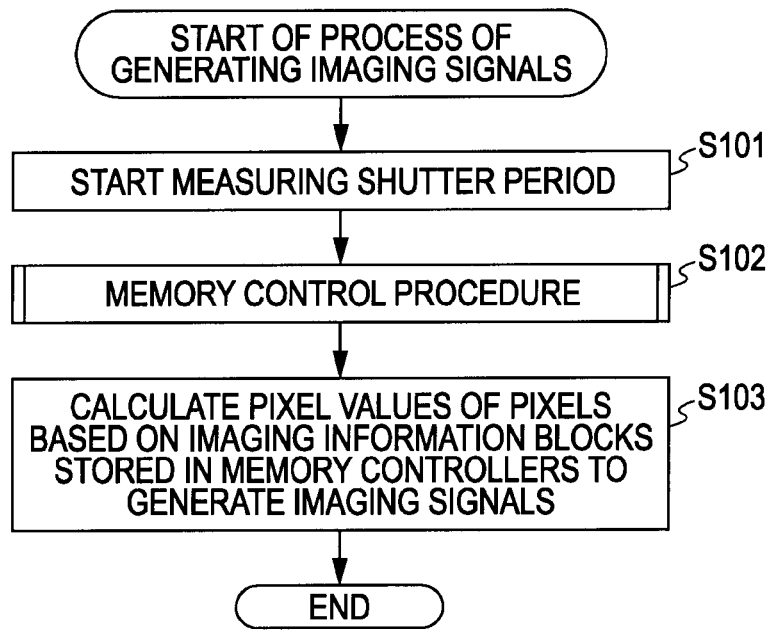
FIG. 12 is a flowchart of another process of generating imaging signals.

After each memory controller 41 performs processing in step S113 to store imaging information of the corresponding pixel, the process proceeds to step S103 in FIG. 12. The camera controller 15 controls the arithmetic section 43 in the imaging-signal generator 31 to calculate charges of the respective pixels on the basis of imaging information blocks stored in (the memory sections 54 of) the memory controllers 41.

The arithmetic section 43 calculates Expression (3) using the threshold arrival period $T_{qt}$ stored as imaging information to obtain the charge $Q_{ts}$ to be accumulated in the shutter period $T_s$ for each pixel. It is assumed that the arithmetic section 43 stores the limit charge $Q_o$ and the shutter period $T_s$ in advance.

The arithmetic section 43 forms one frame using pixel values corresponding to the charges $Q_{ts}$ obtained as described above to generate imaging signals of one frame and supplies the generated imaging signals to the camera signal processor 13.

Figure 14:
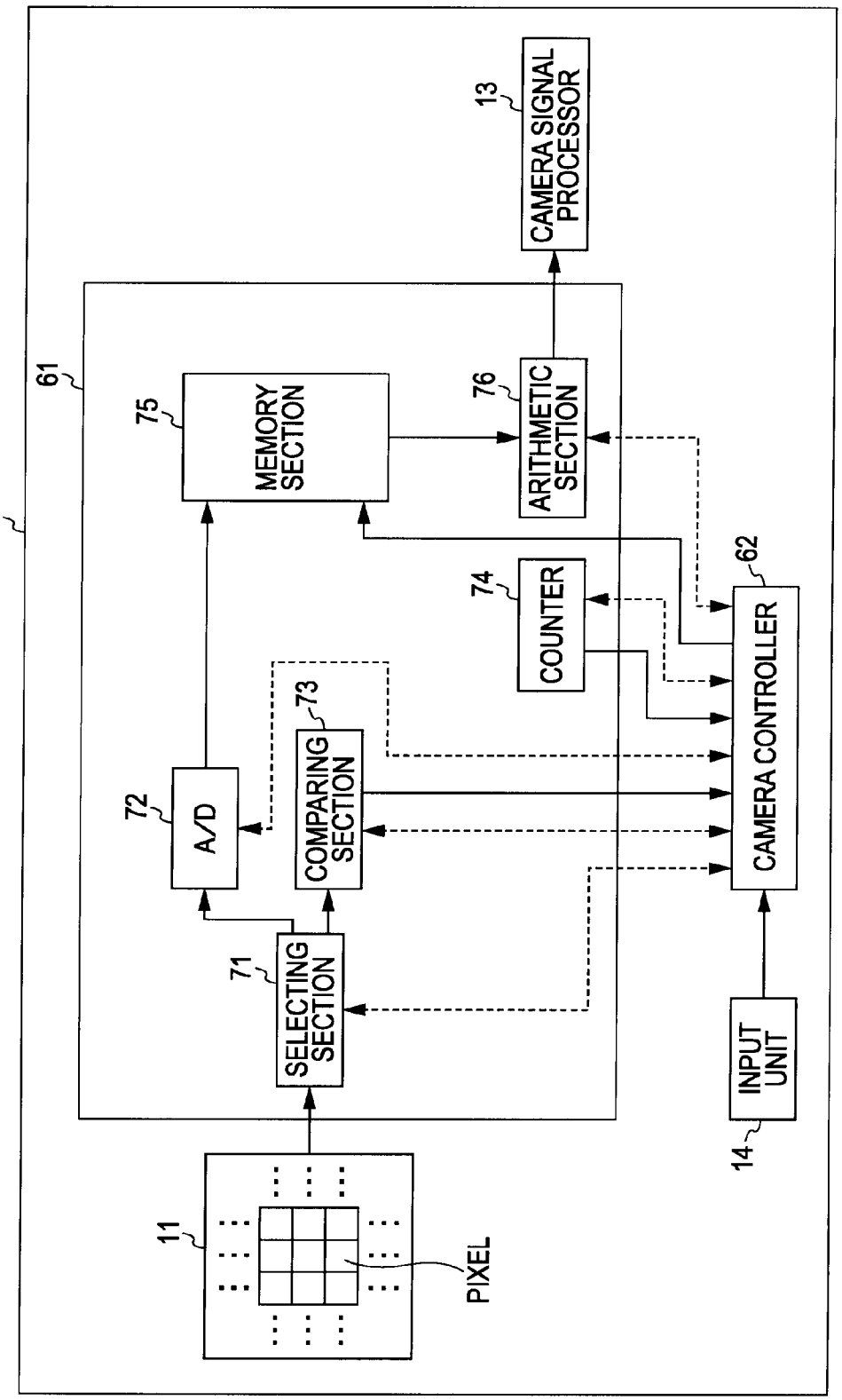
FIG. 14 is a block diagram of a video camera 1 according to another embodiment of the present invention.

FIG. 14 shows the structure of a video camera 1 according to another embodiment of the present invention. The video camera 1 includes an imaging-signal generator 61 and a camera controller 62 instead of the imaging-signal generator 12 and the camera controller 15 shown in FIG. 1, respectively. Other components are designated by the same reference numerals as those in FIG. 1 and descriptions thereof will be appropriately omitted.

Figure 15:
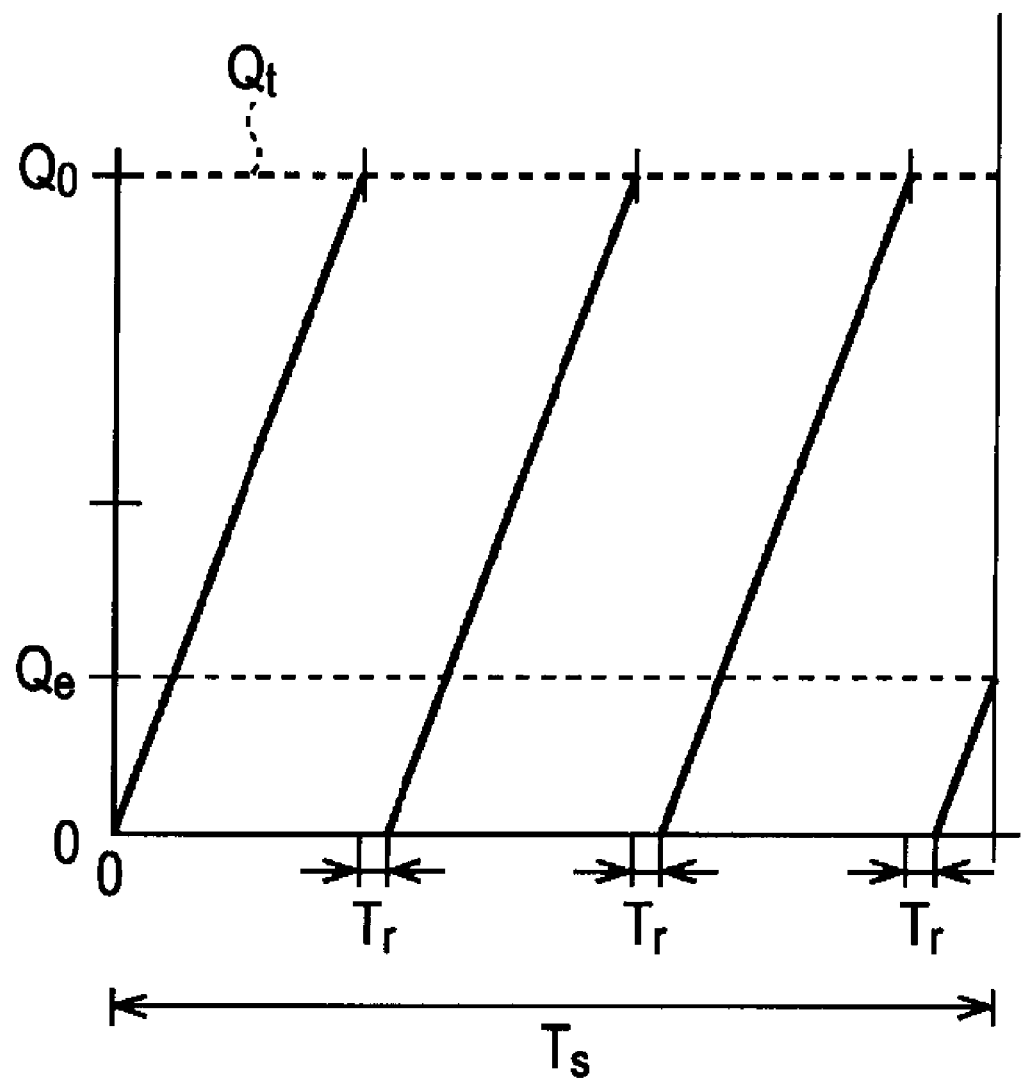
FIG. 15 is a diagram explaining the principle of another process of generating imaging signals.

Referring to FIG. 15, the imaging-signal generator 61 sets a limit charge $Q_o$ to a threshold charge $Q_t$. When a charge reaches the threshold charge $Q_t$ within a shutter period $T_s$, the imaging-signal generator 61 eliminates accumulated charge, starts charge accumulation, and counts the number of charge eliminations. The imaging-signal generator 61 calculates Expression (4) using the number of charge eliminations (three times in a case shown in FIG. 15) and a charge $Q_e$ at the termination of the shutter period $T_s$ to obtain a charge $Q_{ts}$ to be accumulated in the shutter period $T_s$.

$$Q_{ts}=(Q_t \times n+Q_e) \times (T_s/T_s(T_r \times n)) \quad (4)$$

where, $Q_t$ denotes the threshold charge, n indicates the number of charge eliminations, $Q_e$ denotes the charge at the termination of the shutter period, $T_s$ indicates the shutter period, and $T_r$ denotes a period of time corresponding to a time lag between charge elimination and restart of charge accumulation.

If a charge does not reach the threshold charge $Q_t$ within the shutter period $T_s$, Expression (4) is calculated on the condition that n=0. Therefore, the charge $Q_e$ at the termination of the shutter period is the charge $Q_{ts}$.

Again referring to FIG. 14, the camera controller 62 controls the imaging-signal generator 61 to store for each pixel of an imaging device 11 the number n of charge eliminations and the charge $Q_e$ at the termination of the shutter period as imaging information contained in the pixel. The camera controller 62 further controls the imaging-signal generator 61 to calculate Expression (4) using the imaging information to obtain the charge $Q_{ts}$ to be accumulated in the shutter period $T_s$ for each pixel.

The structure of the imaging-signal generator 61 will now be described.

A selecting section 71 sequentially selects pixels of the imaging device 11 one at a time and supplies a signal (e.g., a voltage signal) corresponding to the magnitude of charge accumulated in the selected pixel to a comparing section 73.

When receiving an instruction from the camera controller 62 (in this case, when a charge of the selected pixel reaches the threshold charge $Q_t$, alternatively, when the shutter period is terminated), the selecting section 71 outputs the charge accumulated in the currently selected pixel to an A/D converting section 72. When the charge accumulated in the pixel is output, the pixel has a charge of 0 (i.e., the accumulated charge is eliminated). During the shutter period, charge accumulation is again started.

The A/D converting section 72 converts charge that is an analog signal supplied from the selecting section 71 into a digital signal indicative of a value of the amount of charge (i.e., the charge $Q_e$). When receiving an instruction from the camera controller 62 (in this case, the shutter period is terminated), the A/D converting section 72 supplies the digital signal indicating the charge $Q_e$ at that time to a memory section 75.

The comparing section 73 determines whether charge accumulated in the selected pixel is saturated on the basis of the signal supplied from the selecting section 71. For example, when determining that the charge is saturated, the comparing section 73 supplies a signal indicating the determination to the camera controller 62.

Specifically, the comparing section 73 holds the threshold charge $Q_t$ equivalent to the limit charge $Q_o$ and compares the threshold charge $Q_t$ with a charge obtained from the signal supplied from the selecting section 71. For example, when the charge is equal to or larger than the threshold charge $Q_t$, the comparing section 73 supplies a signal indicating the fact to the camera controller 62.

In this case, it is assumed that the camera controller 62 sets the threshold charge $Q_t$ in the comparing section 73.

A counter 74 measures a period of time by counting with accuracy enough for quantization steps necessary for expression of gradations of an image. The counter 74 starts counting in accordance with the control of the camera controller 62 and supplies a count to, for example, the camera controller 62.

The memory section 75 stores a charge (in this case, the charge $Q_e$ at the termination of the shutter period) of a pixel supplied from the A/D converting section 72 and the number n of charge eliminations in the pixel supplied from the camera controller 62 as imaging information of the pixel such that the charge is associated with the number n.

An arithmetic section 76 calculates Expression (4) using imaging information of each pixel stored in the memory section 75 in accordance with the control of the camera controller 62 to obtain the charge $Q_{ts}$ to be accumulated in the shutter period $T_s$. It is assumed that the arithmetic section 76 holds the periods $T_s$ and $T_r$, which are necessary for calculation of Expression (4) and are not included in imaging information, in advance. The arithmetic section 76 forms one frame using pixel values corresponding to the determined charges $Q_{ts}$ to generate imaging signals of one frame and supplies the generated imaging signals to the camera signal processor 13.

Figure 16:
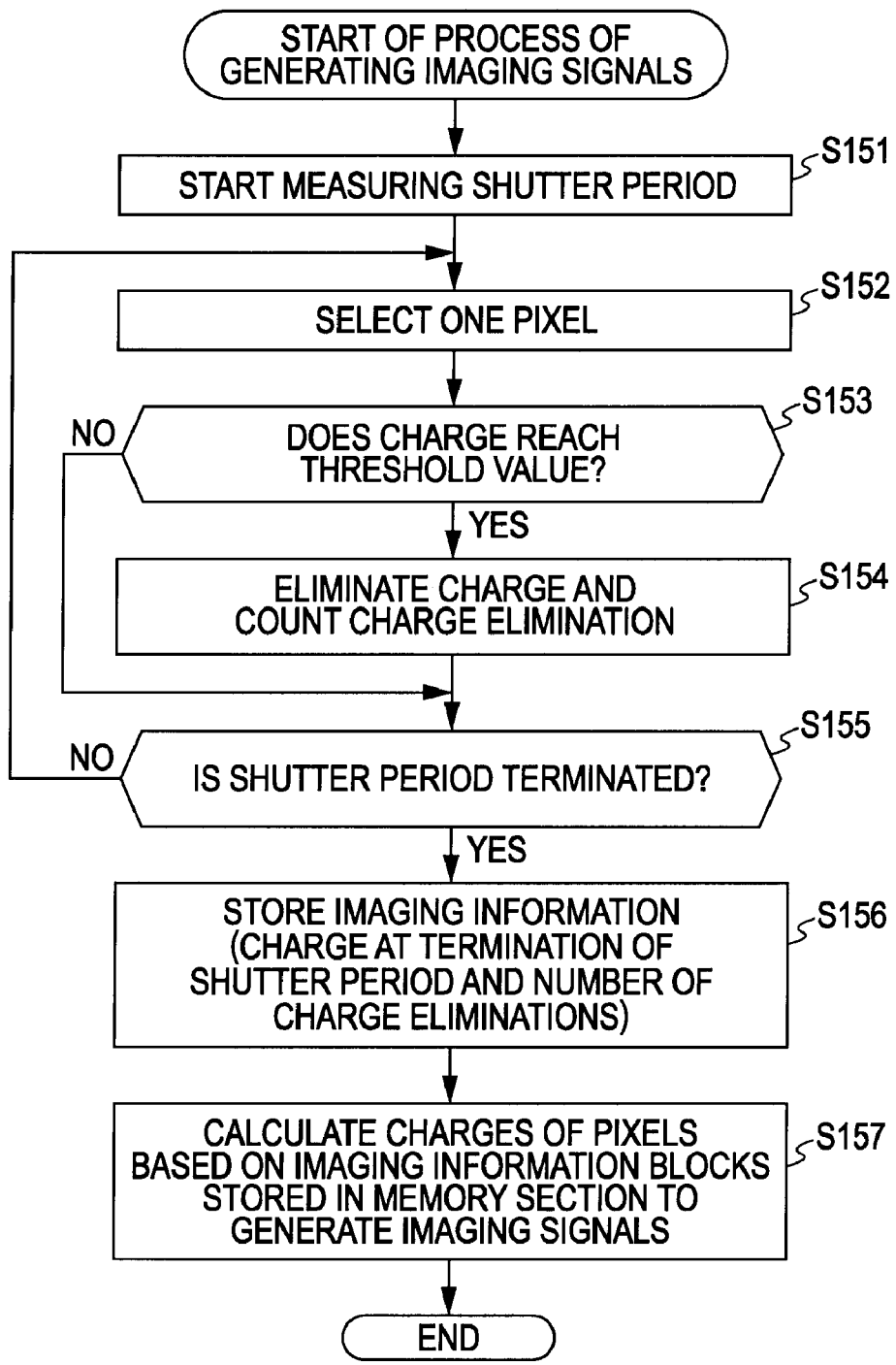
FIG. 16 is a flowchart of the process.

A process of generating imaging signals by the imaging-signal generator 61 will now be described with reference to a flowchart of FIG. 16.

In step S151, measuring a shutter period is started in a manner similar to step S1 in FIG. 3.

In step S152, one pixel of the imaging device 11 is selected in a predetermined order.

In step S153, whether a charge of the currently selected pixel reaches the threshold charge $Q_t$ is determined in the same way as step S3 in FIG. 3. If it is determined that the charge of the currently selected pixel reaches the threshold charge $Q_t$, the process proceeds to step S154.

In step S154, charge accumulated in the currently selected pixel is eliminated and this charge elimination is counted.

Specifically, the camera controller 62 outputs an output instruction to the selecting section 71 and the A/D converting section 72. Thus, the selecting section 71 outputs charge accumulated in the currently selected pixel to the A/D converting section 72. The A/D converting section 72 outputs a value (i.e., the charge $Q_e$) obtained by A/D conversion to the memory section 75. At that time, charge accumulated in the currently selected pixel is eliminated. The camera controller 62 increments a value of a counter built therein by one to count the number n of charge eliminations with respect to the currently selected pixel. The value of this counter is initialized to zero upon starting the process.

Figure 5:
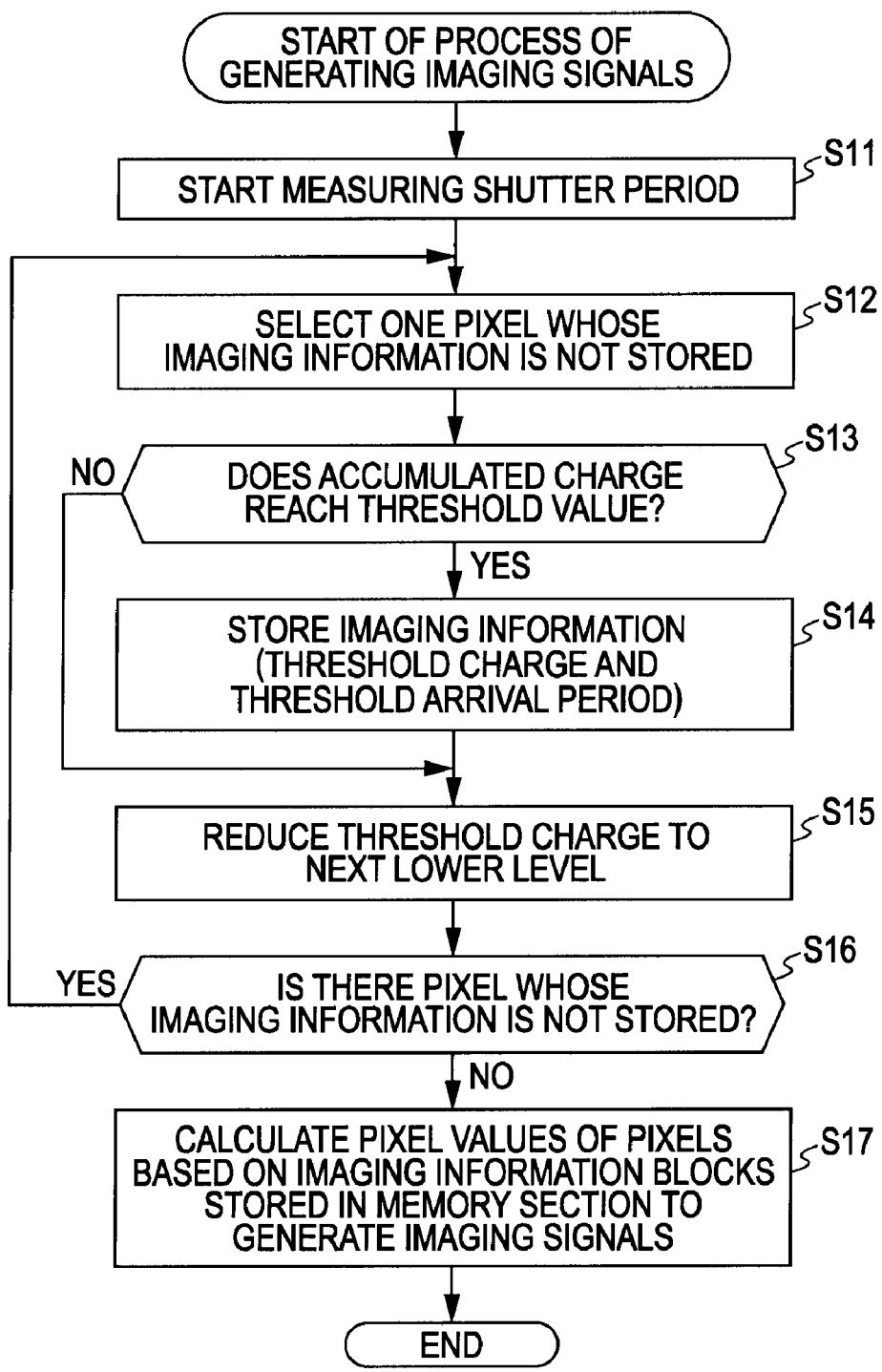
FIG. 5 is a flowchart of the process.

In step S155, whether the shutter period is terminated is determined in a manner similar to step S5 in FIG. 5. If it is determined that the shutter period is not terminated, the process is returned to step S151. In other words, the next pixel is selected and processing in steps S153 to S155 is similarly performed for the selected pixel. Since the processing in steps S152 to S155 is repeated until the shutter period is terminated, a pixel which has been selected once may be repeatedly selected until the shutter period is terminated.

If it is determined in step S155 that the shutter period is terminated, the process proceeds to step S156. In step S156, the charge $Q_e$ at that time (i.e., at the termination of the shutter period) of each pixel and the number n of charge eliminations thereof are stored as imaging information of the pixel into the memory section 75.

Specifically, the pixels are sequentially selected by the selecting section 71 in accordance with the control of the camera controller 62, charge currently accumulated in the selected pixel is analog-to-digital converted by the A/D converting section 72, and the resultant signal is supplied to the memory section 75. In addition, a signal indicating the number n of charge eliminations of the selected pixel is supplied from the camera controller 62 to the memory section 75. The charge $Q_e$ of the selected pixel supplied from the A/D converting section 72 and the number n of charge eliminations supplied from the camera controller 62 are stored in association with each other as imaging information of the pixel into the memory section 75.

After that, the process proceeds to step S157. In step S157, the camera controller 62 controls the arithmetic section 76 of the imaging-signal generator 61 to generate imaging signals of one frame on the basis of imaging information blocks of the respective pixels stored in the memory section 75.

Specifically, the arithmetic section 76 calculates Expression (4) using the imaging information blocks of the respective pixels stored in the memory section 75 to obtain the charges $Q_{ts}$ to be accumulated in the shutter period $T_s$ of the respective pixels.

The arithmetic section 76 forms one frame using pixel values corresponding to the charges $Q_{ts}$ obtained as described above to generate imaging signals of one frame. The arithmetic section 76 supplies the generated imaging signals to the camera signal processor 13.

In Expression (4), the period $T_r$ corresponding to a time lag between charge elimination and restart of charge accumulation is taken into consideration. When the period $T_r$ is vanishingly small as compared with the shutter period $T_s$, the charge $Q_{ts}$ can be calculated using Expression (5), where $T_r$=0, instead of Expression (4).

$$Q_{ts}=(Q_t \times n + Q_e) \quad (5)$$

The above-described series of processing can be executed by hardware or software. When the series of processing is executed by software, a program constituting the software is installed on a general-purpose computer.

Figure 17:
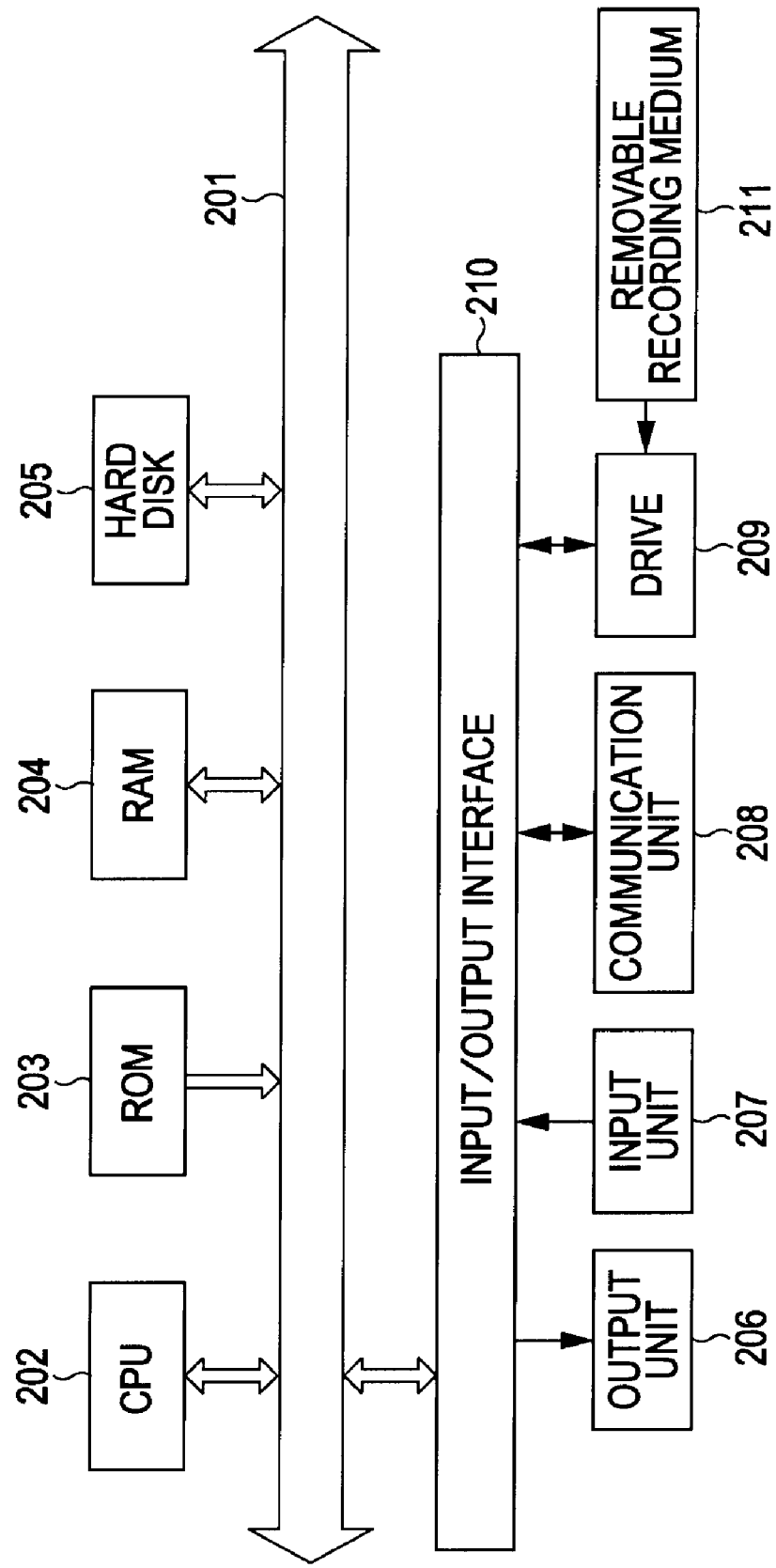
FIG. 17 is a diagram of the structure of a personal computer.

FIG. 17 illustrates the structure of a computer on which a program for executing the above-described series of processing according to an embodiment is installed.

The program may be previously recorded on a hard disk 205, serving as a recording medium built in the computer, or a read only memory (ROM) 203.

Alternatively, the program may be temporarily or permanently stored (recorded) on a removable recording medium 211, such as a flexible disk, a compact disc read only memory (CD-ROM), a magneto-optical (MO) disk, a digital versatile disc (DVD), a magnetic disk, or a semiconductor memory. The removable recording medium 211 can be provided as a software package.

As described above, the program can be installed from the removable recording medium 211 into the computer. Alternatively, the program may be transferred to the computer from a download site through a satellite for digital satellite broadcasting in a wireless manner. Alternatively, the program can be transferred to the computer through a network, such as a local area network (LAN) or the Internet, in a wired manner. The computer may receive the program transferred as described above through a communication unit 208 and install the received program onto the built-in hard disk 205.

The computer has therein a central processing unit (CPU) 202. The CPU 202 and an input/output interface 210 are connected to a bus 201. When the CPU 202 receives an instruction, which is generated by a user operation on an input unit 207 including a keyboard, a mouse, and a microphone, through the input/output interface 210, the CPU 202 executes the program stored in the ROM 203. Alternatively, the CPU 202 loads the program stored in the hard disk 205, the program which has been transferred through a satellite or a network and been installed in the hard disk 205 through the communication unit 208, or the program which has been read from the removable recording medium 211 arranged in a drive 209 and been installed in the hard disk 205, into a random access memory (RAM) 204 and then executes the program, thus allowing the CPU 202 to perform the above-described process realized by the arrangement of any of the foregoing block diagrams. As necessary, the CPU 202 allows, for example, an output unit 206 including a liquid crystal display (LCD) and a speaker through the input/output interface 210 to output the result of processing, allows the communication unit 208 through the input/output interface 210 to transmit the result of processing, or records the result of processing onto the hard disk 205.

The program may be executed by one computer or be executed by a plurality of computers in a distributed manner. Furthermore, the program may be transferred to a remote computer and be executed by the computer.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   means for converting light incident on an imaging device having a plurality of pixels into charge;
   means for determining, for each pixel of the imaging device, whether an accumulated charge of the pixel reaches a threshold charge within a shutter period elapsed from a shutter period start point when entrance of light incident on the imaging device is started to a shutter period end point when the entrance of incident light is terminated;
   means for measuring, for each pixel of the imaging device, a threshold arrival period, the threshold arrival period being a time period elapsed from the shutter period start point to a threshold arrival point, the threshold arrival point corresponding to a time at which the charge of the pixel reaches the threshold charge;
   means for storing, for each pixel for which the means for determining determines that the accumulated charge of the pixel reaches the threshold charge, at least the threshold arrival period of the pixel;
   means for calculating, for each pixel for which the means for determining determines that the accumulated charge of the pixel reaches the threshold charge, a charge to be accumulated by the pixel from incident light during the shutter period on the basis of the threshold arrival period of the pixel stored in the means for storing and the threshold charge; and
   means for generating, for each pixel for which the means for determining determines that the accumulated charge of the pixel reaches the threshold charge, an imaging signal using a value corresponding to the charge calculated for the pixel by the means for calculating as a pixel value of the pixel.

2. The apparatus according to claim 1, wherein
   the means for storing stores, for each pixel for which the means for determining determines that the accumulated charge of the pixel does not reach the threshold charge, a value obtained by analog-to-digital conversion of the accumulated charge of the pixel, at the shutter period end point, and the means for generating generates, for each pixel for which the means for determining determines that the accumulated charge of the pixel does not reach the threshold charge, an imaging signal corresponding to the value stored for the pixel in the means for storing, as a pixel value of the pixel.

3. The apparatus according to claim 1, wherein the threshold charge is a charge capacitance of each pixel of the imaging device.

4. The apparatus according to claim 1, wherein the threshold charge changes such that a charge of each pixel of the imaging device reaches the threshold charge in the shutter period.

5. The apparatus according to claim 4, wherein the threshold charge gradually decreases from a charge capacitance of each pixel to zero during the shutter period, and the means for calculating calculates, for each pixel for which the means for determining determines that the accumulated charge of the pixel reaches the threshold charge, the charge to be accumulated by the pixel from incident light during the shutter period on the basis of the threshold arrival period of the pixel stored in the means for storing and a threshold charge which corresponds to the threshold arrival period of the pixel stored in the means for storing, according to the gradual decrease in the threshold charge.

6. The apparatus according to claim 1, wherein, for each pixel for which the means for determining determines that the accumulated charge of the pixel reaches the threshold charge, the means for storing stores the threshold arrival period of the pixel in association with a value obtained by analog-to-digital conversion of the accumulated charge of the pixel during the threshold arrival period of the pixel, and the means for calculating calculates a charge to be accumulated by incident light during the shutter period for the pixel, on the basis of the threshold arrival period of the pixel and the associated value stored in the means for storing.

7. The apparatus according to claim 1, wherein the means for determining, the means for measuring, and the means for storing are provided for each pixel of the imaging device.

8. The apparatus according to claim 1, wherein, for each pixel for which the means for determining determines that the accumulated charge of the pixel does not reach the threshold charge, the means for storing stores the threshold arrival period of the pixel in association with a value obtained by analog-to-digital conversion of the accumulated charge of the pixel during the threshold arrival period and the means for calculating calculates a charge to be accumulated by incident light during the shutter period for the pixel, on the basis of the threshold arrival period of the pixel, the associated value stored in the means for storing, and the shutter period.

9. A method of image processing for generating imaging signals using charge accumulated in an imaging device, the method comprising:

determining, for each pixel of the imaging device, whether an accumulated charge of the pixel reaches a threshold charge within a shutter period elapsed from a shutter period start point when entrance of light incident on the imaging device is started to a shutter period end point when the entrance of incident light is terminated;

measuring, for each pixel of the measuring device, a threshold arrival period, the threshold arrival period being a time period elapsed from the shutter period start point to a threshold arrival point, the threshold arrival point corresponding to a time at which the charge of the pixel reaches the threshold charge;

storing, for each pixel for which the determining determines that the accumulated charge of the pixel reaches the threshold charge, at least the threshold arrival period of the pixel;

calculating, for each pixel for which the means for determining determines that the accumulated charge of the pixel reaches the threshold charge, a charge to be accumulated by the pixel from incident light during the shutter period on the basis of the stored threshold arrival period of the pixel and the threshold charge; and generating, for each pixel for which the means for determining determines that the accumulated charge of the pixel reaches the threshold charge, an imaging signal using a value corresponding to the calculated charge for the pixel as a pixel value of the pixel.

10. A computer readable storage medium storing computer readable instructions thereon that, when executed by a processor, cause the processor to perform a method for generating imaging signals using charge accumulated in an imaging device, comprising:

determining, for each pixel of the imaging device, whether an accumulated charge of the pixel reaches a threshold charge within a shutter period elapsed from a shutter period start point when entrance of light incident on the imaging device is started to a shutter period end point when the entrance of incident light is terminated;

measuring, for each pixel of the measuring device, a threshold arrival period, the threshold arrival period being a time period elapsed from the shutter period start point to a threshold arrival point, the threshold arrival point corresponding to a time at which the charge of the pixel reaches the threshold charge;

storing, for each pixel for which the determining determines that the accumulated charge of the pixel reaches the threshold charge, at least the threshold arrival period of the pixel;

calculating, for each pixel for which the determining determines that the accumulated charge of the pixel reaches the threshold charge, a charge to be accumulated by the pixel from incident light during the shutter period on the basis of the stored threshold arrival period of the pixel and the threshold charge; and generating, for each pixel for which determining determines that the accumulated charge of the pixel reaches the threshold charge, an imaging signal using a value corresponding to the calculated charge for the pixel as a pixel value of the pixel.

11. An image processing apparatus comprising:

an imaging device that converts light incident on the imaging device having a plurality of pixels into charge;

a determining unit that determines, for each pixel of the imaging device, whether an accumulated charge of the pixel reaches a threshold charge within a shutter period elapsed from a shutter period start point when entrance of light incident on the imaging device is started to a shutter period end point when the entrance of incident light is terminated;

a measuring unit that measures, for each pixel of the imaging device, a threshold arrival period, the threshold arrival period being a time period elapsed from the shutter period start point to a threshold arrival point, the threshold arrival point corresponding to a time at which the charge of the pixel reaches the threshold charge;

a memory unit that stores, for each pixel for which the determining unit determines that the accumulated charge of the pixel reaches the threshold charge, at least the threshold arrival period of the pixel;

an arithmetic unit that calculates, for each pixel for which the determining unit determines that the accumulated charge of the pixel reaches the threshold charge, a charge to be accumulated by the pixel from incident light during the shutter period on the basis of the threshold arrival period of the pixel stored in the memory unit and the threshold charge; and a generating unit that generates, for each pixel for which the determining unit determines that the accumulated charge of the pixel reaches the threshold charge, an imaging signal using a value corresponding to the charge calculated for the pixel by the arithmetic unit as a pixel value of the pixel.

* * * * *